(12) United States Patent
Tanii et al.

(10) Patent No.: US 7,218,585 B2
(45) Date of Patent: May 15, 2007

(54) INFORMATION MEDIUM AND INFORMATION RECORDING/REPRODUCTION APPARATUS

(75) Inventors: Kiyoshi Tanii, Higashiosaka (JP); Hiroyuki Yamaguchi, Nishinomiya (JP); Shoichi Okabayashi, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 249 days.

(21) Appl. No.: 10/489,748

(22) PCT Filed: Jan. 30, 2003

(86) PCT No.: PCT/JP03/00869

§ 371 (c)(1),
(2), (4) Date: Mar. 15, 2004

(87) PCT Pub. No.: WO03/067581

PCT Pub. Date: Aug. 14, 2003

(65) Prior Publication Data

US 2004/0240350 A1    Dec. 2, 2004

(30) Foreign Application Priority Data

Feb. 1, 2002    (JP) ............................. 2002-025152

(51) Int. Cl.
*G11B 7/00* (2006.01)
(52) U.S. Cl. ............................. 369/47.36; 369/275.3; 369/47.4
(58) Field of Classification Search ............... 369/47.1, 369/47.36, 47.38, 47.39, 275.3, 47.4
See application file for complete search history.

(56) References Cited

U.S. PATENT DOCUMENTS

| | | | |
|---|---|---|---|
| 4,958,314 A | 9/1990 | Imai et al. | |
| 6,549,721 B1 | 4/2003 | Ando et al. | |
| 6,597,647 B2 | 7/2003 | Kanno et al. | |
| 6,714,509 B2* | 3/2004 | Kumagai et al. | 369/275.4 |
| 6,894,961 B1 | 5/2005 | Osakabe | |
| 6,915,377 B2* | 7/2005 | Hitotsui | 711/112 |

FOREIGN PATENT DOCUMENTS

| | | |
|---|---|---|
| JP | 61-296576 | 12/1986 |
| JP | 63-2170 | 1/1988 |
| JP | 63-220482 | 9/1988 |
| JP | 2-246053 | 10/1990 |
| JP | 4-12159 | 1/1992 |
| JP | 4-176058 | 6/1992 |
| JP | 9-128301 | 5/1997 |
| JP | 9-198846 | 7/1997 |
| JP | 11-238362 | 8/1999 |
| JP | 2000-82276 | 3/2000 |
| JP | 2000-113458 | 4/2000 |
| JP | 2000-163751 | 6/2000 |
| JP | 2001-283443 | 10/2001 |

* cited by examiner

*Primary Examiner*—Nabil Hindi
(74) *Attorney, Agent, or Firm*—Hamre, Schumann, Mueller & Larson, P.C.

(57) ABSTRACT

An information medium includes a lead in area and a data area capable of recording an arbitrary information signal. The lead in area has a recordable portion where an information signal can be recorded. The recordable portion of the lead in area has an identifier $I_1$ defining a recording speed applicable when recording an information signal in the data area. This increases accuracy defining the recording speed.

12 Claims, 15 Drawing Sheets

| Identifier signal | Recording speed mode |
|---|---|
| 0 0 0 0 | No speed designated |
| 0 0 0 1 | Single speed only |
| 0 0 1 0 | Double speed only |
| 0 0 1 1 | Double speed or single speed |
| 0 1 0 0 | Triple speed only |
| 0 1 0 1 | Triple speed or single speed |
| 0 1 1 0 | Triple speed or double speed |
| 0 1 1 1 | Triple speed or double speed or single speed |
| 1 0 0 0 | Quadruple speed only |
| 1 0 0 1 | Quadruple speed or single speed |
| 1 0 1 0 | Quadruple speed or double speed |
| 1 0 1 1 | Quadruple speed or double speed or single speed |
| 1 1 0 0 | Quadruple speed or triple speed |
| 1 1 0 1 | Quadruple speed or triple speed or single speed |
| 1 1 1 0 | Quadruple speed or triple speed or double speed |
| 1 1 1 1 | All speeds quadruple speed and less |

FIG. 14

INFORMATION MEDIUM AND INFORMATION RECORDING/REPRODUCTION APPARATUS

TECHNICAL FIELD

The present invention relates to information media provided with a data region capable of recording desired information signals, and information recording and reproducing devices for recording and reproducing desired information to and from such information media.

BACKGROUND ART

CD-ROM and DVD-ROM read-only disc-shaped media, and CD-R, CD-RW, DVD-R, DVD-RW, and DVD-RAM recordable disc-shaped media, as storage media for personal computers, and devices for recording, recording and reproducing, or recording, erasing, and reproducing these disc-shaped media have become widespread.

There has been a shift in interest from read-only disc-shaped media, which are designed to handle only pre-recorded data, to recordable disc-shaped media that allow users to input and save data. In particular, in order to store image data, in recent years much energy has been poured into developing recordable discs capable of holding large volumes of data. For example, DVD-R, DVD-RW, and DVD-RAM discs (these three are hereinafter referred to as "recordable discs"), which have much larger storage capacities than CD-R or CD-RW discs, have been developed and becoming more popular.

On the other hand, it is desirable that recording speeds are increased in order to record large volumes of information signals to large capacity recordable discs. High-speed recording technologies have begun to be developed for devices for recording and reproducing, or recording, erasing, and reproducing, recordable discs (hereinafter, these are referred to as recording devices).

Recording devices must be compatible with a plurality of types of recordable discs with different recording capacities. Recording devices also must be able to handle a plurality of different recording speeds. With a recording device for DVD-RAM discs, for example, at present recording can be carried out at two recording speeds, normal speed and double speed. Thus, in conventional DVD-RAM discs, as shown in FIG. 15, identifiers indicating that recording at double speed is possible are recorded as non-rewritable pits to a pit portion provided in the lead-in region of the disc substrate. Also, conventional DVD-RAM recording devices were configured so that when a new DVD-RAM disc was placed in the device, the device would read information written in the pit portion to ascertain the recording speed of that disc and carry out recording at the recording speed that was ascertained.

However, high-speed recording continues to be a high priority for recording devices, and conventionally there has been a clear demand for recording speeds of at least triple speed (hereinafter, referred to as "high speed" in this specification). For example, with recordable discs compatible with low speeds such as double speed, for example, as mentioned above, the information on the compatible recording speeds was recorded as pits in the pit portion of the lead-in region of the disc, allowing the recording speed to be controlled. However, the following problems occurred when using recordable discs capable of not only the normal recording speed but also high recording speeds of triple and quadruple speed, for example, in addition to double speed.

That is, different recording speeds result in changes in specific and very important recording conditions of recordable discs, such as the intensity of the light beam that is irradiated onto the information layer when a user records desired data and the mode of pulse modulation. Consequently, in the case of a recordable disc that can be recorded at a plurality of different high speeds, when the above conventional technology is adapted without modification, information on the plurality of recording conditions corresponding to the recording speeds must be recorded as pits in the lead-in region in addition to the identifiers indicating which recording speeds can be handled.

However, with conventional recording devices performing recording control simply by detecting only the pit portion there was a risk that factors such as incorrect detection of the pit portion, for example, would result in insufficient reliability with respect to appropriate recording. Consequently, to ensure recording reliability, it is necessary to record identifiers and information on the recording conditions twice or three times in the lead-in region.

There are also the following problems with respect to the manufacture of recordable discs. That is, the pit portion of the lead-in region was formed in a non-rewritable format on the disc substrate using a stamper having a surface configuration that corresponds to pits. Thus, conventionally it was necessary to prepare a dedicated stamper for each disc capable of adapting to different recording speeds. Accordingly, the following problem is conceivable. To take an example, if discs capable of recording at high speeds of quadruple speed or more are mainstream, then a sudden increase in demand for recordable discs designed for triple speed or less would mean that the substrates for recordable discs that can be recorded at high recording speeds of quadruple speed or more could not be used as the substrates for recordable discs designed for triple speed or less. This is because the identifiers that are recorded in the pit portion of substrates for recording discs designed for quadruple speed or more as non-rewritable pits are different from the identifiers for recordable discs that are triple speed or less. Consequently, in such a case, it would be necessary to remanufacture a stamper for forming non-rewritable identifiers for triple speed or less in the pit portion and to manufacture disc substrates using this stamper. Therefore, the inability to quickly respond to changes in the demand for discs is a foreseeable problem.

In the case of phase-change recordable discs such as DVD-RAM discs, at a minimum the data region is phase-changed to an erased state (ordinarily this is done through crystallization, and thus will be referred to as initializing crystallization, crystallization, initialization, or initializing, for example) so that in general users can record desired information. Then, information indicating which recording operation to use with respect to the disc and information on the recording devices capable of recording to the disc, for example, are recorded in the recordable portion of the lead-in region and the disc is shipped.

With phase-change recordable discs as well, conventionally the identifiers specifying compatible recording speeds were recorded in the pit portion of the lead-in region. However, there are instances in which even though identifiers indicating that the disc can be recorded at quadruple speed or more, for example, are formed in the pit potion of the lead-in region of the substrate, some problem in the process for forming the information layer on the substrate results in the disc being found to be incompatible with quadruple speed prior to shipping. In such instances, even though the disc can be recorded at triple speed or less without problems, the recordable disc that has been produced is discarded, and this wastes resources and/or energy.

DISCLOSURE OF INVENTION

It is an object of the present invention to provide an information medium that solves the current problems discussed above and an information recording and reproducing device for recording and reproducing the information medium.

To achieve the above object, an information medium according to the present invention is provided with a lead-in region and a data region in which information signals can be recorded, wherein the lead-in region has a recordable portion in which information signals can be recorded, and wherein an identifier specifying a recording speed with respect to the data region is provided in the recordable portion of the lead-in region.

BRIEF DESCRIPTION OF DRAWINGS

FIG. 14 is a diagram describing an example of identifiers that can be adopted in the present invention.

BEST MODE FOR CARRYING OUT THE INVENTION

Figure 1:
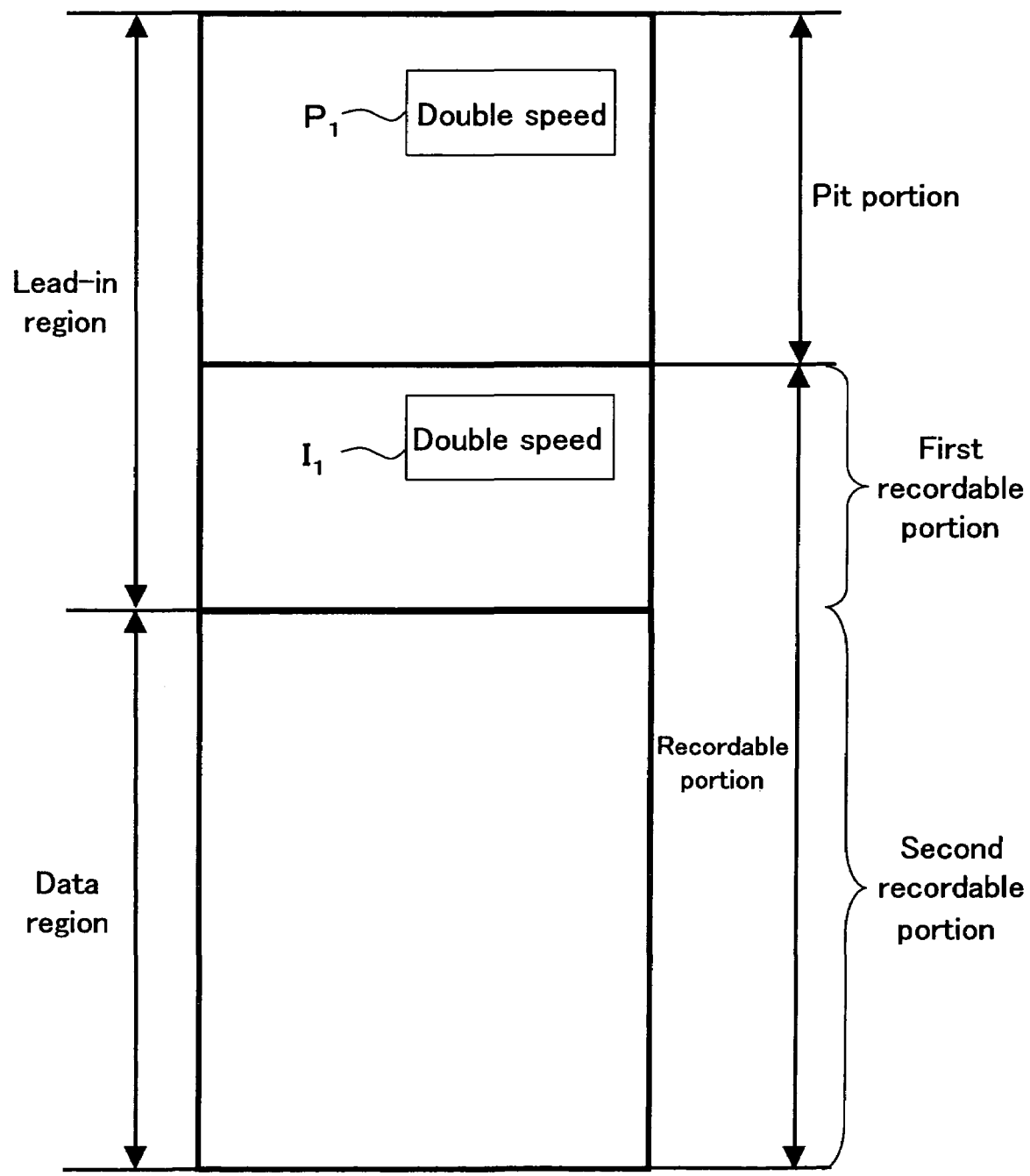
FIG. 1 is a diagram describing a configuration of an information medium according to a first embodiment of the present invention.

The information medium of the present invention, as described above, is provided with a lead-in region and a data region in which an information signal can be recorded, in which the lead-in region has a recordable portion in which information signals can be recorded, and in which an identifier specifying a recording speed with respect to the data region is provided in the recordable portion of the lead-in region. The identifier provided in the recordable portion of the lead-in region of the information medium of the present invention can be an identifier that directly specifies a recording speed per se, as well as an identifier that indirectly specifies a recording speed in correspondence with other information specified in another area of the information medium or in a memory or the like of the information recording and reproducing device, for example. A conceivable example of the latter is an information medium provided with a pit portion in the lead-in region, in which an identifier specifying a recording speed with respect to the data region of the information medium is provided in the pit portion and an identifier corresponding to the identifier of the pit portion (for example, an identifier that indicates whether the identifier of the pit portion is valid or invalid) is provided in the recordable portion of the lead-in region.

According to the present invention, since an identifier is recorded in the recordable portion of the lead-in region, a recording speed that can be adopted for the information medium can be specified more accurately than with conventional information media, in which identifiers were recorded in a non-rewritable pit portion. Consequently, the precision with which the recording speed of the information medium is recognized can be increased and the reliability of information signals recorded to the data region also can be increased.

Also, with respect to the information medium of the present invention, it is preferable that the identifier recorded in the recordable portion of the lead-in region specifies a maximum speed that can be adopted as the recording speed with respect to the data region. This is because it is not necessary to increase the number of identifiers of the lead-in region even if the number of recording speeds with which a single information medium is compatible increases.

In the information medium of the present invention, it is preferable that the lead-in region further includes a pit portion in which non-rewritable pits are formed, and that an identifier specifying a recording speed with respect to the data region is also formed in the pit portion as pits. With this configuration, identifiers specifying the recording speed are provided in both the recordable portion and the pit portion of the lead-in region, and thus with a device for carrying out recording with respect to this information medium, the recording speed can be detected in duplicate when information signals are recorded. Accordingly, an information medium in which information is recorded to the data region with increased reliability can be achieved.

In this information medium, the relationship between the recording speeds specified by the identifiers recorded in the pit portion and the recordable portion of the lead-in region can be any of the following conditions (1) to (5).

(1) The identifier recorded in the recordable portion of the lead-in region and the identifier recorded in the pit portion specify the same recording speed.

(2) The identifier recorded in the recordable portion of the lead-in region and the identifier recorded in the pit portion specify different recording speeds.

(3) The identifier recorded in the pit portion specifies a plurality of different recording speeds, and the identifier recorded in the recordable portion of the lead-in region specifies at least one of the plurality of different recording speeds.

(4) The identifier recorded in the pit portion specifies a plurality of different recording speeds, and the identifier recorded in the recordable portion of the lead-in region specifies a recording speed that is different from the plurality of different recording speeds.

(5) The identifier recorded in the pit portion specifies a plurality of different recording speeds, and the recording speed specified by the identifier of the lead-in region is equal to or less than the fastest recording speed that is specified by the identifier of the pit portion.

With the configuration of (1) described above, identifiers specifying the same recording speed are recorded in the recordable portion of the lead-in region and in the pit portion, increasing the precision with which the recording speed is recognized.

With the configuration of (2) described above, identifiers specifying different recording speeds are recorded in the recordable portion of the lead-in region and in the pit portion, and thus appropriately selecting which recording speed to use in the device for carrying out recording using this recording medium increases the versatility of the information medium.

With the configuration of (3) described above, for example, of the plurality of different recording speeds specified by the identifiers recorded in the pit portion, it is possible to specify a recording speed that can be adopted by individual information media by the identifier of the recordable portion of the lead-in region. Accordingly, the same stamper for stamping the pits of the pit portion to a substrate can be shared by information media, for example, improving the yield of the information media.

With the configuration of (4) described above, different recording speeds can be specified in the recordable portion of the lead-in region and the pit portion, increasing the degree of freedom with which the recording speed is specified.

With the configuration of (5) described above, it is possible to guarantee a recording speed that can be adopted by the information medium by the identifier of the lead-in region.

It is also possible for the information medium of the present invention to have a lead-in region provided with a recordable portion (first recordable portion) and a non-rewritable pit portion, and a data region provided with a second recordable portion in which can be recorded an information signal, wherein a first identifier in which information specifying a speed with which to record to the second recordable portion is recorded as pits is provided in the pit portion, and an identifier corresponding to the first identifier is provided in the first recordable portion. A conceivable embodiment of this is a configuration in which a recording speed is specified directly by the first identifier, and an identifier that indicates whether the first identifier is valid or invalid, for example, is provided in the first recordable portion as the identifier corresponding to the first identifier.

In the information medium of the present invention, it is preferable that recording conditions corresponding to a recording speed specified by the identifier are recorded and correlated to that identifier. Recording conditions for example are the various conditions that relate to recording information to the data region, and include the light intensity when recording and the pulse modulation mode. This configuration allows multiple recording conditions, which are recorded as pits in the control region provided in the pit portion of the lead-in region, to be confirmed as well, increasing the reliability with which information signals are recorded to the data region.

In the information medium according to the present invention, it is preferable that the identifier of the recordable portion of the lead-in region is recorded in a region describing a medium state (also referred to as a disc identification zone) included in the recordable portion. Accordingly, information on the recording speed is provided in addition to information on the information medium itself and the usage record of devices for carrying out recording with respect to the information medium, increasing the search speed when recording with a recording and reproducing device, and accordingly increasing the reliability with which the recording speed is detected as well.

It is preferable that the information medium according to the present invention further is provided with a lead-out region, wherein an identifier that specifies a speed for recording to the data region is recorded in the lead-out region as well. Since the lead-out region is accessed less frequently than the lead-in region, there is the advantage that identifiers recorded in the lead-out region experience little signal deterioration.

Moreover, to achieve the foregoing object, an information recording and reproducing device according to the present invention is provided with an optical pickup for irradiating a light onto an information medium to record and reproduce information signals to and from an information layer of the information medium, a support portion for rotatably supporting the information medium, a motor for rotating the information medium supported by the support portion, a rotation control portion for controlling rotation of the motor, and a signal processing portion for processing information signals that are reproduced from the information medium by the optical pickup, wherein when an information medium of the present invention is supported by the support portion and the signal processing portion confirms the presence of the identifier from the information signal reproduced by the optical pickup from the recordable portion of the lead-in region of the information medium, the rotation control portion controls the motor in correspondence with the recording speed specified by the identifier.

With this information recording and reproducing device, the number of rotations of the motor for rotatively driving the information medium of the present invention is controlled based on the recording speed specified by the identifier provided in the recordable portion of the lead-in region of the information medium, thus allowing an appropriate recording speed when recording information signals to the data region to be achieved and allowing the reliability of the information recorded to the data region to be increased.

If the information medium has the above-described configuration in addition to a pit portion being provided, then with respect to the information recording and reproducing device of the present invention it is preferable that this information medium is supported by the support portion, the optical pickup reproduces information signals from the recordable portion of the lead-in region and the pit portion of the information medium, and the signal processing portion ascertains whether the identifier can be confirmed in the information signal from the recordable portion and the information signal from the pit portion.

This information recording and reproducing device confirms the presence of identifiers specifying a recording speed in both the recordable portion of the lead-in region and the pit portion of the information medium. Consequently, the degree of freedom in selecting the recording speed is increased, and for example there is the added effect that a user can choose freely the quality control of information signals after they have been recorded to the data region, for example.

With the above-described information recording and reproducing device, it is preferable that if the signal processing portion recognizes only one identifier from the information signal reproduced by the optical pickup from the recordable portion of the lead-in region of the information medium, then the rotation control portion controls the motor so as to correspond to a speed that is equal to or less than the recording speed specified by the identifier. According to this configuration, in addition to the operations and effects of the above-described information recording and reproducing device, it is possible to provide an information medium that itself can guarantee the quality of information signals recorded to the data region, and that is inexpensive due to the increased manufacturing yield of the information medium.

Also, with respect to the above information recording and reproducing device, it is preferable that if the signal processing portion confirms a plurality of identifiers from the information signal reproduced by the optical pickup from the recordable portion of the lead-in region of the information medium, then the rotation control portion controls the motor so as to correspond to any one of the plurality of recording speeds specified by the plurality of identifiers, or so as to correspond to a recording speed that is less than the slowest recording speed of the plurality of recording speeds. According to this configuration, in addition to the operations and effects of the above-described information recording and reproducing device, there is also the added effect that the recording speed when recording to the data region can be fine tuned and the information recording capability of the information medium can be utilized fully.

Also, with respect to the above information recording and reproducing device, it is preferable that if the signal processing portion cannot recognize an identifier from the information signal reproduced by the optical pickup from the recordable portion of the lead-in region of the information medium, then the rotation control portion controls the motor so as to correspond to a recording speed that is equal to or less than the slowest speed of the recording speeds specified by the identifier confirmed from the information signal reproduced from the pit portion. With this configuration, the upper limit value of the recording speed at which the quality of the information signals recorded to the data region can be ensured can be set, thus allowing the user to carry out recording to the information medium without worry. It should be noted that a configuration in which the recording speed is not limited if an identifier is not provided also can be selected freely by changing the algorithm of the information recording and reproducing device. Choosing this configuration allows the process steps for recording identifiers during manufacture of the information medium to be eliminated, thereby inhibiting rises in the cost of information media that are compatible with all recording speeds.

Embodiments of the present invention are described in further detail below.

Among information media that are capable of recording large volumes of information signals, in very specific terms, DVD-RAM discs are specified in a standard called the "DVD Specifications for Rewritable Disc," DVD-RW discs are specified in a standard called the "DVD Specifications for Re-recordable Disc," and DVD-R discs are specified in a standard called the "DVD Specifications for Recordable Disc." According to these standards, the recording region of a DVD can be divided generally into a data region in which desired information signals can be recorded to an information layer, and a lead-in region in which information required for recording information signals to the data region is recorded.

The lead-in region is made of a pit portion in which predetermined information signals are recorded in advance as pits during fabrication of a substrate on which an information layer is formed, a recordable portion in which predetermined information signals are recorded (written) to the information layer, and a mirror portion made of a portion of the information layer formed on the flat portion of the substrate in which information signals are not recorded. The mirror portion is provided at the boundary between the pit portion and the recordable portion. The pit portion is also known as the pre-pit portion and the embossed portion. In DVD-RAM discs and DVD-RW discs, the recordable portion is also known as the rewritable portion. The pit portion is made of an initial zone, a reference code zone, a buffer zone, and a control data zone. The recordable portion is made of a guard track zone, a disc test zone, a drive test zone, a disc identification zone, and a DMA1 and DMA2.

It should be noted that in an information medium provided with a rewritable information layer, predetermined signals are recorded after the information layer has been initialized, and thus all information signals formed in the recordable portion of the lead-in region are lost when initialization is performed again, for example. However, in the case of recordable discs, users do not initialize the information later after the initialization executed by the manufacturer prior to shipping, and thus optical damage does not occur to information recorded in the recordable portion of the lead-in region.

In conventional recordable discs, information on the recording speed at which information signals are recorded to the information layer of the data region (that is, the second recordable portion) is allocated one byte in the control data zone of the pit portion. This information is confirmed from the identifier of the pit portion (that is, the first identifier) when the optical pickup of an information recording and reproducing device accesses the pit portion. Then, conventional information recording and reproducing devices keep the recording speed with respect to the recordable disc at a predetermined speed based on this information by controlling the number of rotations of the motor for rotatively driving the recordable disc using rotation control means.

However, an increase in the recording speed not only results in an increase in the number of data specifying recording speeds but the recording conditions corresponding to the recording speeds also change. Consequently, to suitably control the recording conditions in the information recording and reproducing device, first it is necessary that information specifying the recording speeds of the recordable disc can be identified accurately. For that reason, it is necessary that the recording speed is identified and confirmed on the recordable disc by the information recording and reproducing device by (1) increasing the number of first identifiers recorded to the pit portion or (2) providing identification information specifying a recording speed that corresponds to the first identifier in the recordable portion of the lead-in region as well.

When (1) is adopted, however, it is possible to increase the number of identifications because the first identifiers are formed as pits, but it is not possible to change that number after the substrate has been manufactured. Consequently, if the disc loses compatibility with any of the plurality of different recording speeds specified by the first identifiers due to an error of some kind when forming the information layer or when initializing a phase-change disc, for example, it becomes necessary to discard that disc even if it is still compatible with other recording speeds, and this wastes resources and energy. Also, with (1), if the user demands suddenly shift, there is no degree of freedom with which to respond to those demands. On the other hand, with (2), it is possible to change the identifiers after the substrate has been manufactured, and there is a high degree of freedom with respect to user demands.

Even if an erasable information layer is provided, as in the case of DVD-RW and DVD-RAM discs, as was discussed above, general users do not initialize the information layer after purchasing the recordable disc, and thus optical damage to the information of the recordable portion of the lead-in region does not occur. Also, with commercially available recording devices, it is not possible to erase information recorded to the recordable portion of the lead-in region. Thus, the reliability of the identifiers recorded to the recordable portion of the lead-in region also can be secured.

Recording identifiers to the recordable portion of the lead-in region can be carried out using the same recording method as that used conventionally to record other information to the recordable portion of the lead-in region. It should be noted that other information conventionally recorded to the recordable portion of the lead-in region is for example the disc identification information, such as write inhibit flags, present in the region describing the medium state, and drive information such as the name of the drive manufacturer. Also, as will be described later, information expressing recording conditions corresponding to the recording speeds specified by the identifiers can be recorded in the recordable portion of the lead-in region along with the identifiers. This information can be recorded using the same procedure at that described above. It should be noted that if there is extra space in the region for recording the identifiers or in zones within that region, then it is preferable that recording conditions corresponding to the recording speeds specified by the identifiers are recorded in the same region (and more preferably in the same zone) as the identifiers.

The area within the recordable portion of the lead-in region in which the identifiers are recoded is not fixed, but the region (the region describing a medium state) specified as the disc identification region in the standard, for example, is particularly preferable because it is where information on the recordable disc and on the recording and reproducing device for recording the recordable disc is written.

The region describing the medium state is made of three regions, (1) a region recording disc identification information writing signals expressing whether information signals can be recorded to the data region, (2) a region recording drive information including the drive manufacturer name, added information, and drive conditions, and (3) a reserve region in which information is not recorded. Of these three regions, the drive information region records information on the information recording and reproducing device, as mentioned above, and thus it is not very preferable as the area in which to write identifiers. Consequently, it is preferable that identifiers are recorded to the disc information region of the region describing the medium state, or to the region that conventionally served as a reserve region in which nothing was recorded.

The disc information region is accessed every time that the settings for allowing/forbidding recording to the data region are changed, or every time that information is recorded to the data region, and thus is searched frequently. Identifiers are not searched as frequently as other information recorded in the disc information region. Also, frequent rewriting of the write inhibit flag runs the risk of unnecessarily rewriting other information recorded in the disc information region as well. The reason for this is that when the write inhibit flag is rewritten, not just that flag but an entire block is rewritten as well. Consequently, it is preferable that the area in which identifiers are recorded is a region other than the disc information region (that is, the region that conventionally served as a reserve region in which nothing was recorded).

A single disc information region has a capacity of 32,768 bytes, and of these, only a single header byte is used to write information (write inhibit flag) indicating whether recording to the data region is possible, and the rest is unused. In the case of a recordable disc without a reserve region, it is also possible for the disc information region to serve as the area in which identifiers are recorded.

Embodiments of the information medium and the information recording and reproducing device of the present invention are described below with reference to the drawings.

First Embodiment

FIG. 1 schematically shows the configuration of a recordable disc provided with a lead-in region and a data region serving as an embodiment of the information medium according to the present invention. From the perspective of information signals, the region on a recordable disc is divided into a pit portion and a recordable portion. The pit portion is a non-rewritable region in which pits are formed by a stamper during manufacture of the recordable disc substrate. The recordable portion is a region in which information signals can be recorded to the information layer by irradiating a light beam. The lead-in region includes a pit portion and a recordable portion, as shown in FIG. 1. The entire data region is a recordable portion. However, in some cases, as in DVD-RAM discs, for example, a sector format is adopted in which addresses are formed as pits in the header of each sector. The information layer of the recordable portion of the lead-in region and the information layer in which information signals are recorded to the data region are made of identical materials and have identical compositions. In this specification, the recordable portion of the lead-in region is referred to as the first recordable portion and the recordable portion of the data region (that is, the entire data region) is referred to as the second recordable portion.

As shown in FIG. 1, the recordable disc of this embodiment is provided with identifiers $P_1$ and $I_1$, which indicate that the disc can be recorded at double speed, in its pit portion and first recordable portion, respectively.

The identifier $P_1$ recorded in the pit portion is stamped as a pit by a stamper when the substrate of the recordable disc is formed, whereas the identifier $I_1$ in the first recordable portion is recorded to the information layer by irradiating a light beam. That is, the recordable disc shown in FIG. 1 is manufactured by (1) creating a substrate provided with the identifier $P_1$ using a stamper, (2) forming on this substrate an information layer that can be recorded at double speed and any other necessary layers, (3) initializing the information layer, and (4) recording information expressing which recording operation to perform with respect to the disc and information on recording devices that can record to the disc, together with the identifier $I_1$ specifying double speed, to the recordable portion of the lead-in region (that is, the first recordable portion).

Figure 2:
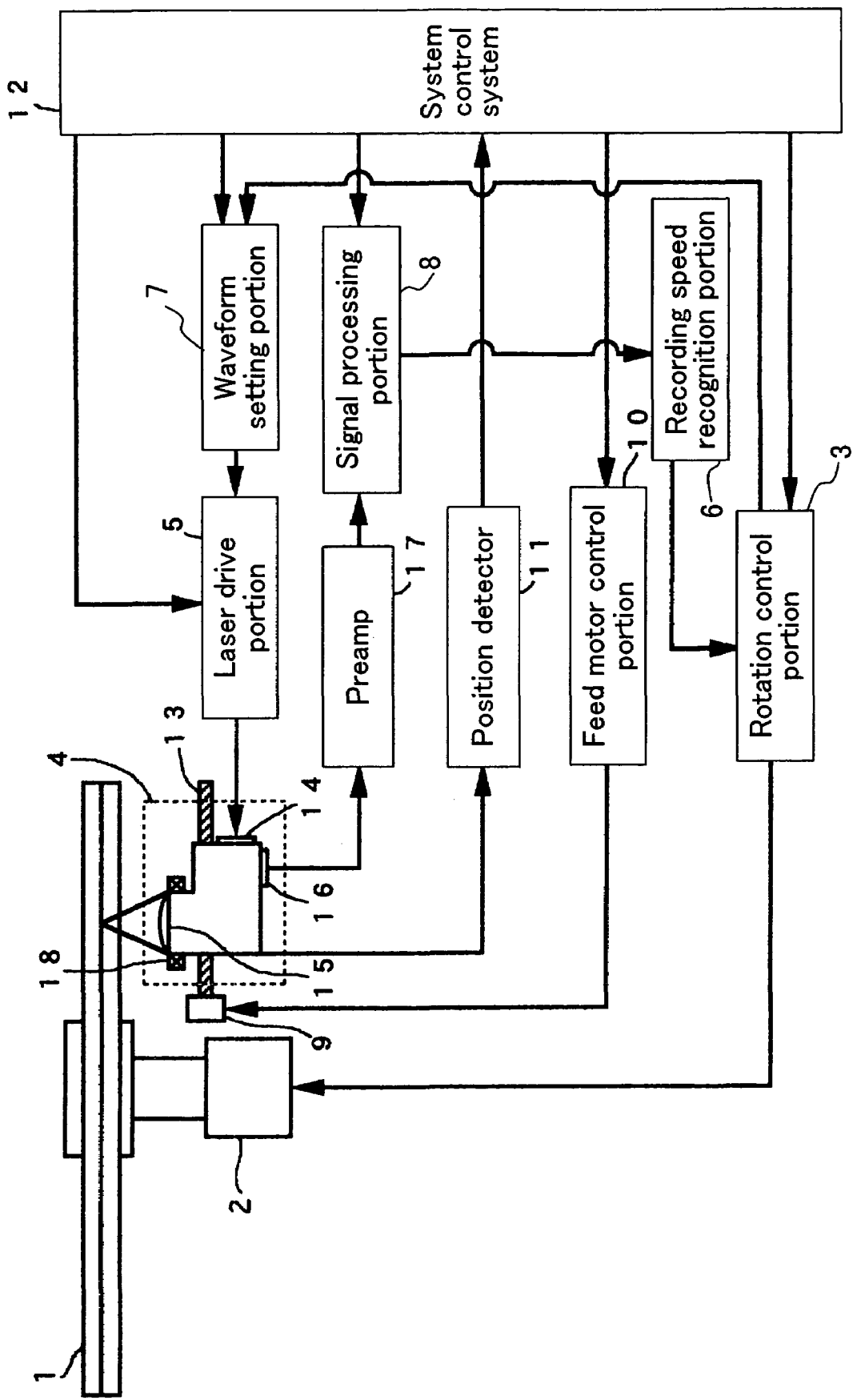
FIG. 2 is a diagram describing the main components of an example of the configuration of the information recording and reproducing device of the present invention.

FIG. 2 is a structural diagram that schematically shows the main portions of the information recording and reproducing device of this embodiment. The information recording and reproducing device of this embodiment is for recording and reproducing desired information signals with respect to the data region of a recordable disc 1 of this embodiment, and is provided with a motor 2, a rotation control portion 3, an optical pickup 4, a laser drive portion 5, a recording speed recognition portion 6, a waveform setting portion 7, a signal processing portion 8, a feed motor 9, a motor control portion 10, a position detector 11, a system control system 12, a guide shaft 13, a laser emission source 14, an objective lens 15, a photodetector 16, and a preamp 17.

The motor 2 is for rotatively driving the recordable disc 1 after it has been placed on a turntable. The rotation control portion 3 controls the number of rotations of the motor 2. The optical pickup 4 is for writing and reading signals to and from the information layer of the recordable disc 1.

The operations of the above-described structural components are described below.

When the recordable disc 1 is placed on the turntable, the system control system 12 controls the number of rotations of the motor 2 by sending a command for a predetermined number of rotations to the rotation control portion 3. At the same time, the system control system 12 sends a command to the feed motor control portion 10 to operate the feed motor 9. The feed motor 9 rotates in accordance with this command, and as a result the optical pickup 4 first moves to the lead-in region of the recordable disc 1 along the guide shaft 13.

When the optical pickup 4 arrives at the lead-in region, the position detector 11 detects this and outputs a signal to the system control system 12. The system control system 12 receives the information that the optical pickup 4 has arrived at the lead-in region, and sends a command via the waveform setting portion 7 to the laser drive portion 5 to emit a laser of a predetermined intensity. The laser drive portion 5 drives the laser emission source 14 based on this command.

The light beam that is emitted by the laser emission source 14 is irradiated onto the lead-in region of the recordable disc 1 via the objective lens 15. Then, the light beam is reflected by the lead-in region and received by the photodetector 16 after passing through the objective lens 15 a second time, where it is converted to an electrical signal that corresponds to the intensity of the reflected light. This electrical signal that has been converted is amplified by the preamp 17. The electrical signal amplified by the preamp 17 is input to the signal processing portion 8 as a reproduction signal from the recordable disc 1. The signal processing portion 8 receives a command from the system control system 12, and determines whether the reproduction signal includes an identifier specifying the recording speed. If the reproduction signal includes such an identifier, then it is sent to the recording speed recognition portion 6.

Figure 3:
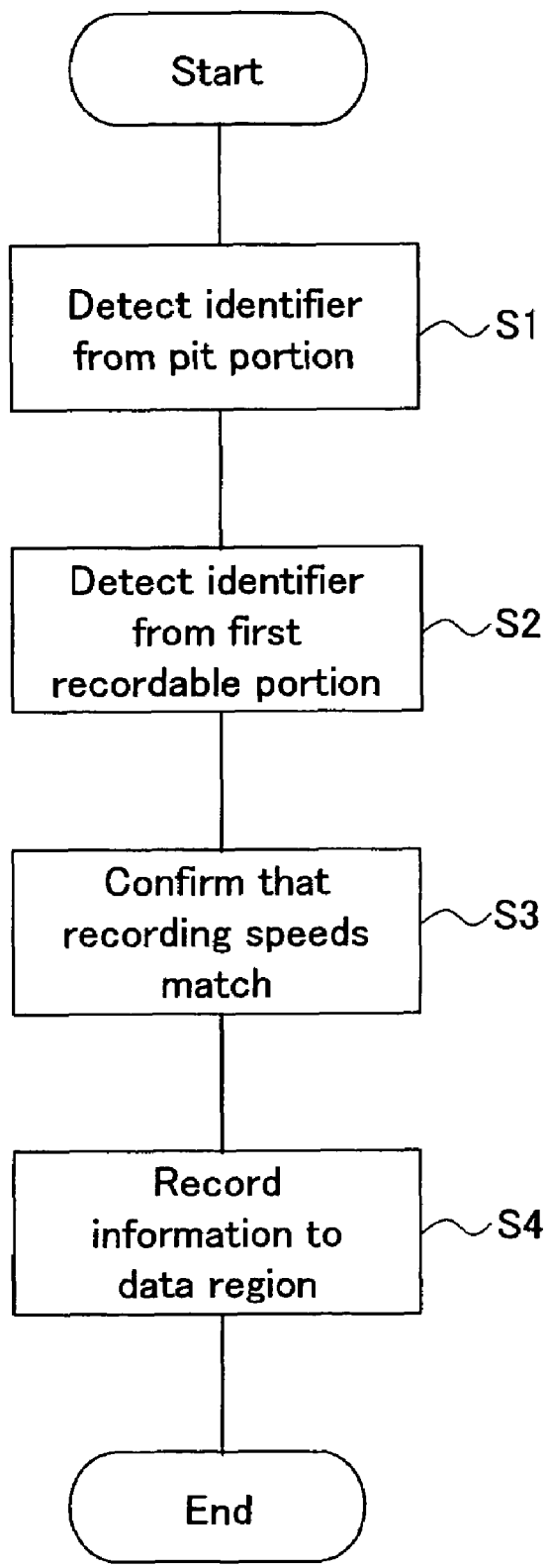
FIG. 3 is a flowchart showing an example of the operation of the information recording and reproducing device of the present invention.

At this time, the signal processing portion 8 determines whether there is an identifier specifying the recording speed in the reproduction signal that is obtained from the pit portion of the lead-in region and the reproduction signal that is obtained from the recordable portion of the lead-in region (the first recordable portion) (steps S1 and S2 in FIG. 3). Then, the recording speed recognition portion 6 confirms that the recording speed specified by identifier of the pit portion matches the recording speed specified by the identifier of the first recordable portion (step S3), and information is recorded to the data region (second recordable portion) at the recording speed that is thus confirmed (step S4).

In step S4, the recording speed recognition portion 6 sends a command for controlling the number of rotations of the motor 2 to the rotation control portion 3 in correspondence with the information (recording speed) of the identifier sent from the signal processing portion 8. The rotation control portion 3, in accordance with this command, rotatively drives the motor 2 so that the number of rotations thereof corresponds to the recording speed specified by the identifier. A position command of the position detector 11 is sent to the system control system 12, and the system control system 12 sends a signal indicating a number of rotations of the feed motor 9 to the feed motor control portion 10. Accordingly, the feed motor 9 moves the optical pickup 4 to a predetermined position of the data region (second recordable portion), and desired information signals are recorded to the second recordable portion.

As shown in FIG. 1, the recordable disc 1 of this embodiment is provided with two identifiers specifying the recording speed, the identifier $P_1$ recorded as pits in the pit portion of the lead-in region and the identifier $I_1$ recorded to the information layer of the recordable portion (first recordable portion) of the lead-in region. It should be noted that in the flowchart of FIG. 2 described above, recording was performed after confirming that the identifier $P_1$ and the identifier $I_1$ specify identical recording speeds. However, the algorithm for determining the recording speed based on the identifier $P_1$ of the pit portion and the identifier $I_1$ of the first recordable portion is not limited to this example, and it is also possible for the manufacturer of the information recording and reproducing device to design the algorithm freely. For example, it is possible to search for the identifier $I_1$ of the first recordable portion only if for some reason the identifier $P_1$ of the pit portion cannot be found. Other specific examples of the algorithm for determining the recording speed are described below in further detail in subsequent embodiments.

In this embodiment, by performing recording after searching for the identifiers $P_1$ and $I_1$ from the lead-in region and the first recordable portion and confirming whether the recording speeds specified by these identifiers match one another, the accuracy with which the recording speeds is recognized by the recording speed recognition portion 6 is increased. Moreover, the recording conditions related to the recording speeds can be determined more accurately in the system control system 12.

Second Embodiment

Figure 4:
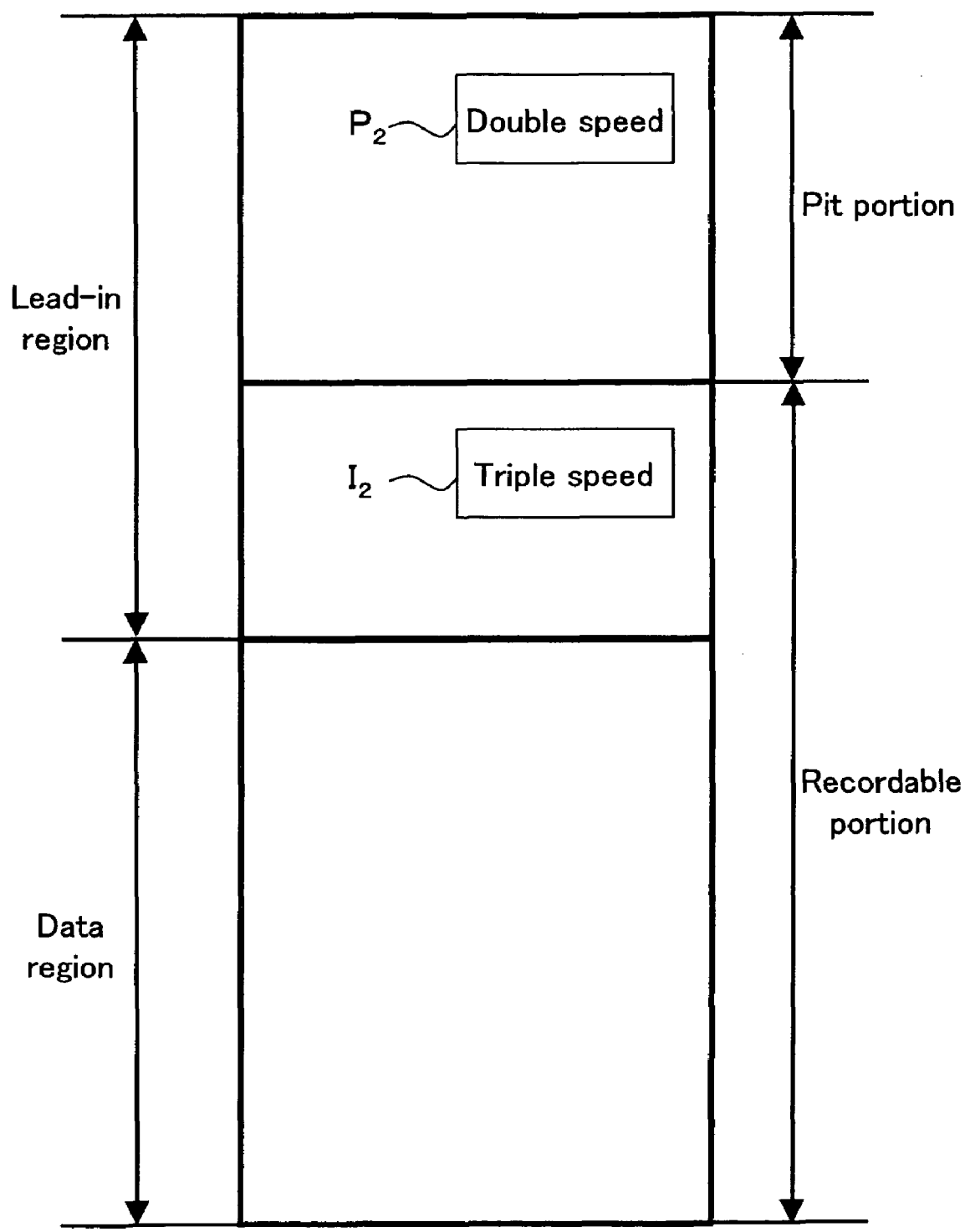
FIG. 4 is a diagram describing a configuration of the information medium according to a second embodiment of the present invention.

FIG. 4 schematically shows the configuration of another embodiment of the recordable disc according to the present invention. This recordable disc differs from that of the first embodiment in that the recording speed specified by the identifier recorded as pits in the pit portion (in this embodiment, double speed) and the recording speed specified by the identifier recorded to the first recordable portion (in this embodiment, triple speed) are different.

That is, the recordable disc shown in FIG. 4 is manufactured by forming an information layer that can be recorded at triple speed, for example, on a substrate in which an identifier specifying double speed is recorded as pits by a stamper, and initializing the information layer, after which information expressing which recording operation to perform with respect to the disc and information on recording devices that can record to the disc, together with an identifier indicates that recording at triple speed is possible, are recorded to the first recordable portion. In other words, the recordable disc shown in FIG. 4 can record information at a maximum speed of triple speed as long as there are no problems, for example, when forming the information layer.

Figure 5:
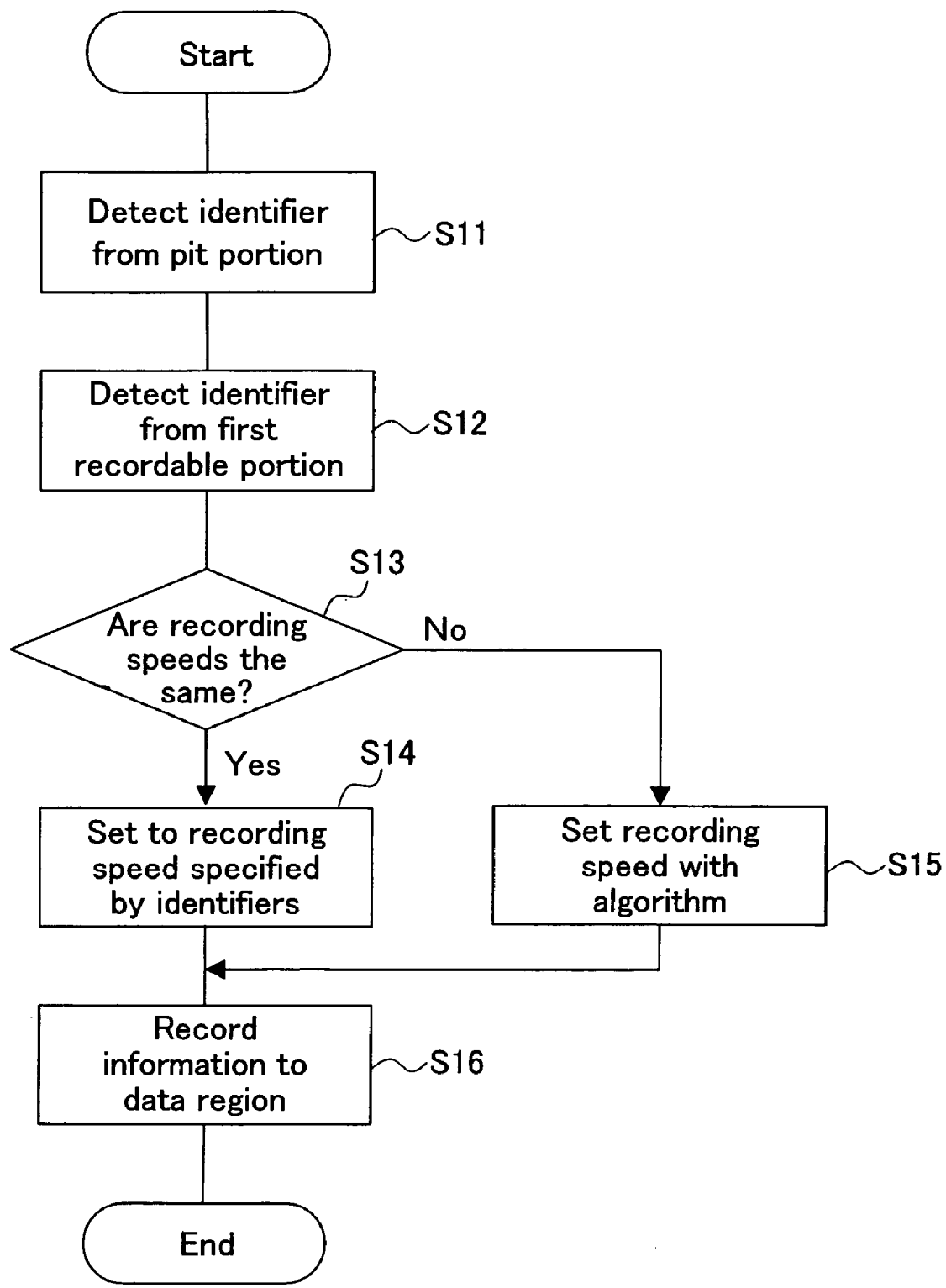
FIG. 5 is a flowchart showing an example of the operation of the information recording and reproducing device of the present invention.

An overview of the procedure for recording information to the recordable disc of this embodiment using the information recording and reproducing device configured as shown in FIG. 2 is illustrated in the flowchart of FIG. 5.

Like the first embodiment, the signal processing portion 8 determines whether identifiers specifying the recording speed are included in the reproduction signal obtained from the pit portion of the lead-in region and the reproduction signal obtained from the recordable portion of the lead-in region (first recordable portion) (steps S11 and S12). Then, the recording speed recognition portion 6 compares the recording speed specified by the identifier of the pit portion and the recording speed specified by the identifier of the first recordable portion (step S13), and if the recording speeds are identical, information is recorded to the data region (second recordable portion) at that recording speed (steps S14 and S16). On the other hand, if it is determined in step S13 that there is a difference in magnitude between the recording speed specified by the identifier of the pit portion and the recording speed specified by the identifier of the first recordable portion, then the system control system 12 determines which recording speed to perform recording at in accordance with a predetermined algorithm (step S15), and information is recorded at the recording speed that is determined (step S16).

In the case of the recordable disc shown in FIG. 4, the recording speed specified by the identifier of the pit portion (double speed) is smaller than the recording speed specified by the identifier of the first recordable portion (triple speed). Consequently, the system control system 12 in step S15 determines the recording speed based on the results of this comparison, and whether the identifier of the pit portion or the identifier of the first recordable portion is given priority, or specifically what control to perform, can be selected freely through the algorithm incorporated into the system control system 12 (or the recording speed recognition portion 6) of the information recording and reproducing device. For example, there are at least three conceivable possibilities. These are: (1) the recording speed specified by the identifier of the first recordable portion (triple speed) is preferentially adopted; (2) the recording speed specified by the identifier of the pit portion (double speed) is preferentially adopted; (3) the disc is determined to be defective and recording is interrupted (that is, step S16 is not executed).

It should be noted that the algorithm for (1) described above is based on the consideration that an information layer that can be recorded at a maximum speed of triple speed has been formed using a substrate manufactured for double speed and thus the identifier of the pit portion specifies double speed, in practice recording up to triple speed can be guaranteed, and the algorithm for (2) is based on the consideration that even though recording at triple speed is possible, the substrate was originally manufactured for double speed, and thus the recording speed specified by the identifier of the pit portion is given priority. The algorithm for (3) is based on the consideration that the recording speed cannot be guaranteed because the identifiers of the substrate and the information layer do not match one another. Any of these considerations may be adopted in accordance with the application, specifications, or design philosophy, for example, of the information recording and reproducing device.

Figure 6:
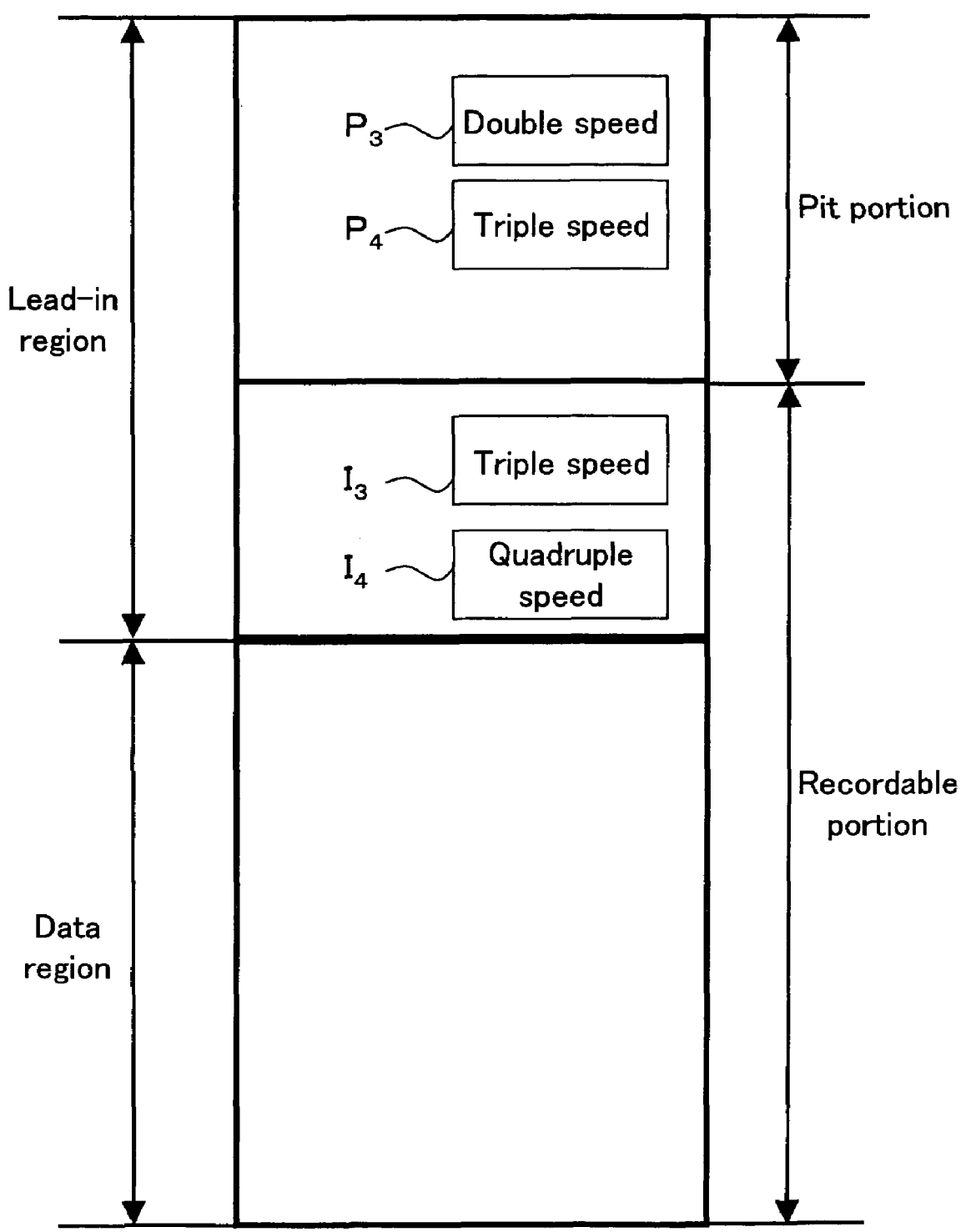
FIG. 6 is a diagram describing another configuration of the information medium according to the second embodiment of the present invention.

FIG. 6 is a schematic configuration diagram for describing another possible configuration of the recordable disc of this embodiment. In the example shown in FIG. 6, there are two identifiers each in the pit portion and the first recordable portion, these being $P_3$ and $P_4$, and $I_3$ and $I_4$, respectively. The identifier $P_3$ indicates that recording at double speed is possible. The identifier $P_4$ indicates that recording at triple speed is possible. The identifier $I_3$ indicates that recording at triple speed is possible. The identifier $I_4$ indicates that recording at quadruple speed is possible.

In other words, an identifier $I_4$ specifying a recording speed (quadruple speed) that is greater than either of the two recording speeds specified by the identifiers $P_3$ and $P_4$ of the pit portion (double speed and triple speed) is recorded in the first recordable portion.

This recordable disc is a disc in which an information layer that can be recorded at triple speed and an information layer that can be recorded at quadruple speed, for example, are formed on a substrate in which identifiers $P_3$ and $P_4$ specifying double speed and triple speed are recorded in the pit portion by stamping, and these information layers are initialized, after which identifiers indicating that recording at triple speed and quadruple speed is possible are recorded in the first recordable portion. Thus, it is possible to manufacture a recordable disc that can be recorded at triple speed and quadruple speed using a substrate for manufacturing a recordable disc compatible with double speed and triple speed.

In the case of the recordable disc shown in FIG. 6 as well, whether to perform recording at a recording speed specified by an identifier of the pit portion (double speed or triple speed) or a recording speed specified by an identifier of the first recordable portion (triple speed or quadruple speed) can be determined by the recording speed recognition portion 6 or the system control system 12 using the same predetermined algorithms as those described with respect to step S15 of FIG. 5.

Figure 7:
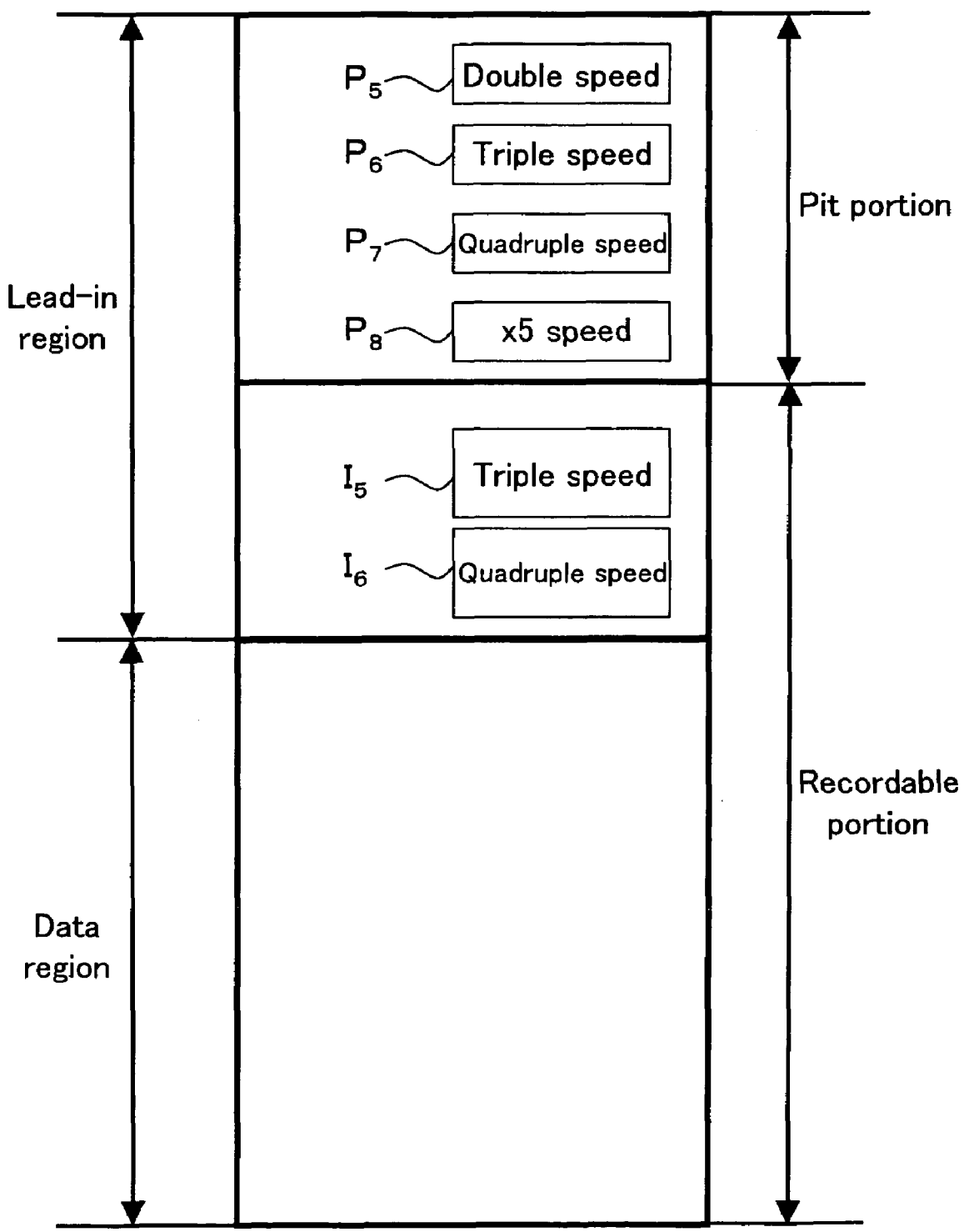
FIG. 7 is a diagram describing yet another configuration of the information medium according to the second embodiment of the present invention.

FIG. 7 is a schematic configuration diagram for describing yet another possible configuration of the recordable disc of this embodiment. The recordable disc shown in FIG. 7 has a plurality of identifiers in both the pit portion and in the first recordable portion. The number of identifiers in the pit portion (in this embodiment, four identifiers $P_5$ to $P_8$) and the number of identifiers in the first recordable portion (in this embodiment, two identifiers $I_5$ and $I_6$) are different. Also, the maximum recording speed specified by an identifier of the pit portion (in this embodiment, ×5 speed specified by $P_8$) is larger than the maximum speed specified by an identifier of the first recordable portion (in this embodiment, quadruple speed specified by $I_6$).

In this way, if the number of identifiers of the pit portion and the number of identifiers of the first recordable portion is different, then the recording speed recognition portion 6 or the system control system 12 of the information recording and reproducing device, when determining the recording speed, can use an algorithm that determines the recording speed taking into account not only the results of comparing the magnitude of the recording speeds specified by the identifiers of the pit portion and the identifiers of the first recordable portion, but also the results of a comparison of the number of identifiers of the pit portion and the number of identifiers of the first recordable portion. Also, which of the above-described algorithms (1) to (3) is adopted can be determined freely by the manufacturer of the recording and reproducing device in accordance with the difference in magnitude of the recording speeds specified by the identifiers of the pit portion and the recording speeds specified by the identifiers of the first recordable portion.

It should be noted that an information recording and reproducing device that, like in this embodiment, compares (1) the difference in magnitude of the recording speeds specified by the identifiers of the pit portion and the recording speeds specified by the identifiers of the first recordable portion, and/or (2) the difference in number of identifiers of the pit portion and the number of identifiers of the first recordable portion, increases the degree of reliability with which the recording speed is set. Also, it becomes possible to identify defects in recordable discs, for example, and thus the reliability of recordable discs and the information recording and reproducing device can be increased.

Also, as shown in FIG. 6 and FIG. 7, if a plurality of identifiers are provided in both the pit portion and the first recordable portion, then whether to adopt as the recordable speed only a recording speed specified by an identifier or whether to adopt recording speeds that are below the lowest recording speed specified by any of the plurality of identifiers as well, can be determined suitably by an algorithm of the system control system 12 (or the recording speed recognition portion 6). For example, in the former case, if there are identifiers specifying triple speed and quadruple speed, then it is determined that the recordable disc can be recorded to only at triple speed or quadruple speed. On the other hand, in the latter case, the recordable disc of FIG. 6 is determined to be recordable at single speed or double speed in addition to triple speed or quadruple speed.

Third Embodiment

Figure 8:
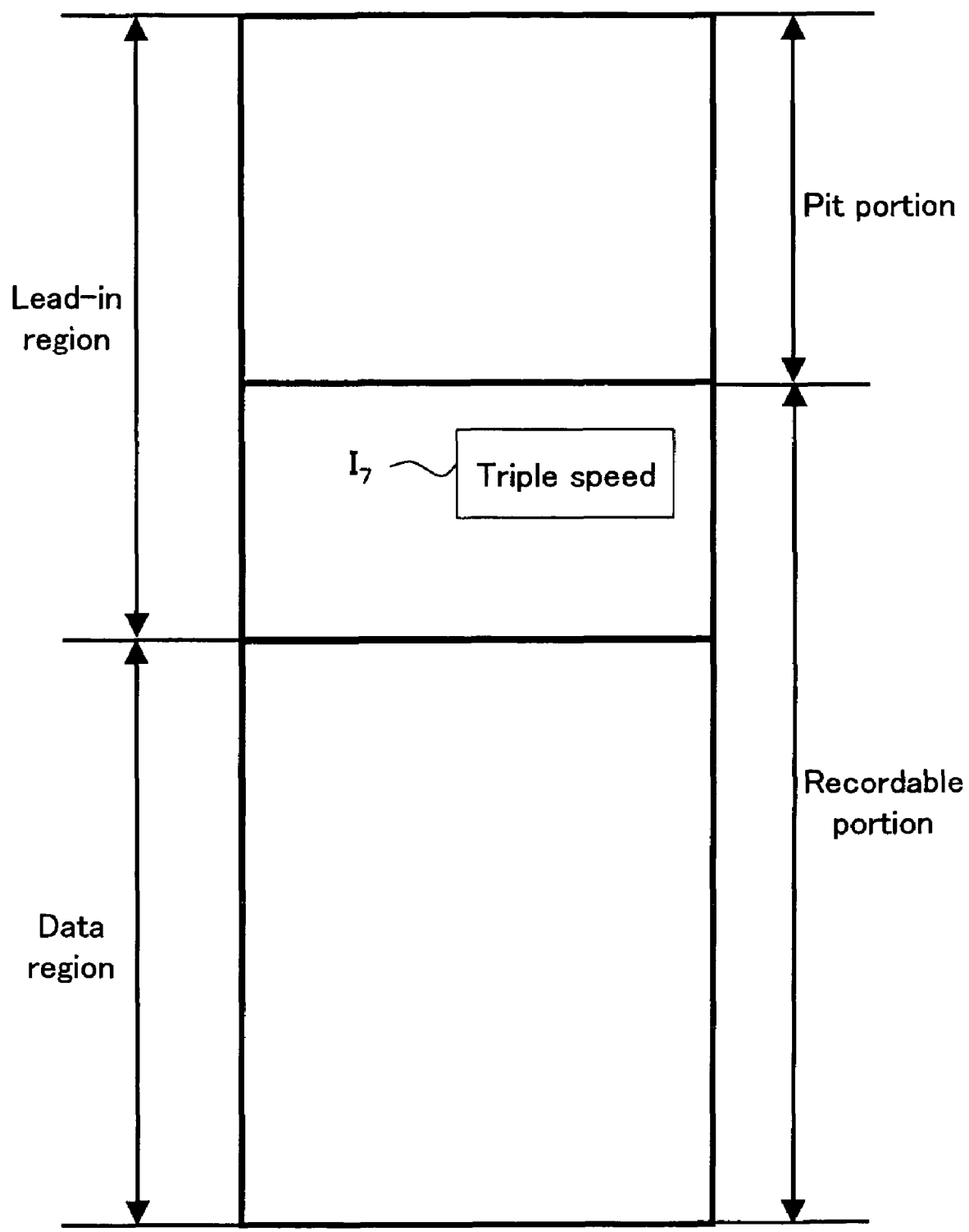
FIG. 8 is a diagram describing a configuration of the information medium according to a third embodiment of the present invention.

FIG. 8 is a schematic configuration diagram showing yet another possible configuration of the recordable disc of the present invention. With this recordable disc, there are no identifiers specifying a recording speed in the pit portion and there is a single identifier $I_7$ (in this embodiment, triple speed) in the first recordable portion only.

With the information recording and reproducing device configured as shown in FIG. 2, when recording information to this recordable disc, the recording speed recognition portion 6 determines that an identifier cannot be confirmed from the reproduction signal obtained from the pit portion, and thus the recording speed specified by the identifier $I_7$ obtained from the reproduction signal obtained from the first recordable portion (in this embodiment, triple speed) is adopted, and information is recorded to the data region at this recording speed.

It should be noted that with some information recording and reproducing devices, recording speeds corresponding to various types of information media may be stored in a memory or the like in advance. If the present invention is applied to such an information recording and reproducing device and a recordable disc such as that shown in FIG. 8 is used, then it is possible for the recording speed specified by the identifier of the first recordable portion and the recording speed stored in the device to be compared, and for the recording speed be determined based on the results of this comparison. In this case, whether to adopt the faster or the slower of the recording speeds specified by the identifier of the disc and the recording speed stored in the device, or whether to interrupt the recording operation if they do not match, can be set freely by an algorithm of the recording speed recognition portion 6 or the system control system 12 of the information recording and reproducing device.

Figure 9:
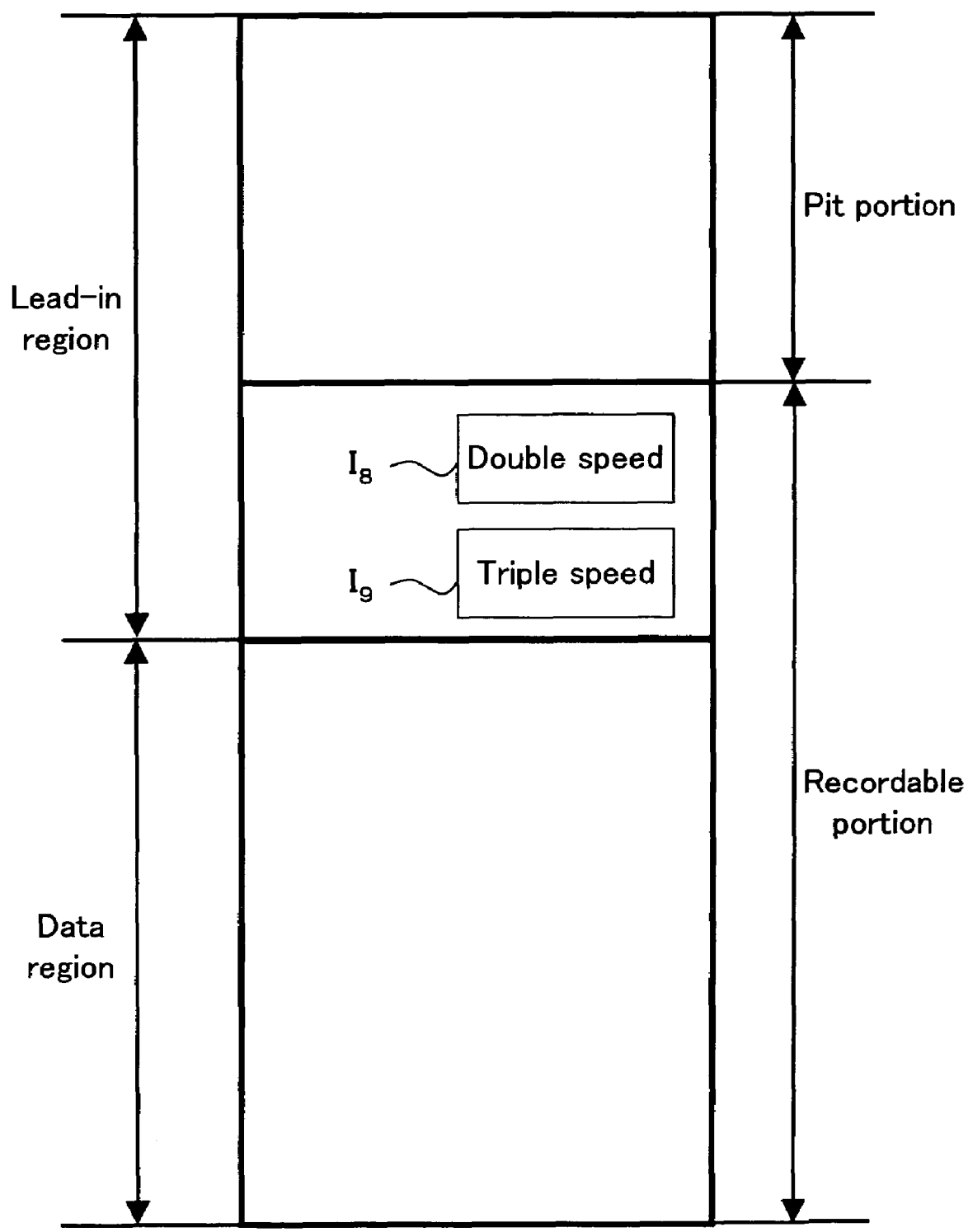
FIG. 9 is a diagram describing another configuration of the information medium according to the third embodiment of the present invention.

FIG. 9 is a schematic configuration diagram for describing yet another possible configuration of the recordable disc of this embodiment. Like the recordable disc of FIG. 8, there is no identifier in the pit portion, and there are two identifiers $I_8$ and $I_9$ (in this embodiment, double speed and triple speed) in the recordable portion (the first recordable portion) of the lead-in region only.

With the information recording and reproducing device configured as shown in FIG. 2, when recording information to this recordable disc, the recording speed recognition portion 6 determines that an identifier cannot be confirmed from the reproduction signal obtained from the pit portion, and thus a recording speed specified by either the identifier $I_8$ or $I_9$ (in this embodiment, double speed or triple speed) obtained from the reproduction signal obtained from the first recordable portion is adopted, and information is recorded to the data region at that recording speed.

It should be noted that as described above, if this recordable disc is used with an information recording and reproducing device in which recording speeds corresponding to the recording medium type are stored in a memory or the like in advance, then it is possible for the recording speeds specified by the identifiers of the first recordable portion and the recording speeds stored in the device in advance to be compared and for the recording speed be determined based on the results of this comparison. In this case, which of the recording speeds specified by the identifier of the disc and the recording speeds stored in the device is adopted can be set freely by an algorithm of the recording speed recognition portion 6 or the system control system 12 of the information recording and reproducing device.

The recordable discs shown in FIG. 8 and FIG. 9 do not have identifiers in their pit portion, and thus compared to the configuration described in the second embodiment there is less reliability with respect to the recording speed at which information signals are recorded to the recordable disc. However, if these recordable discs are used in tandem with an information recording and reproducing device that determines the recording speed giving priority to identifiers of the first recordable portion over identifiers of the pit portion, then information signals can be recoded to the data region of these discs at an appropriate speed. It should be noted that although the recordable discs of this embodiment are provided with a pit portion in the lead-in region, the present invention can also be applied to recordable discs that are not provided with a pit portion. That is, recordable discs in which the entire lead-in region is a recordable portion also fall within the scope of the present invention, and can record information signals at appropriate recording speeds.

Fourth Embodiment

Figure 10:
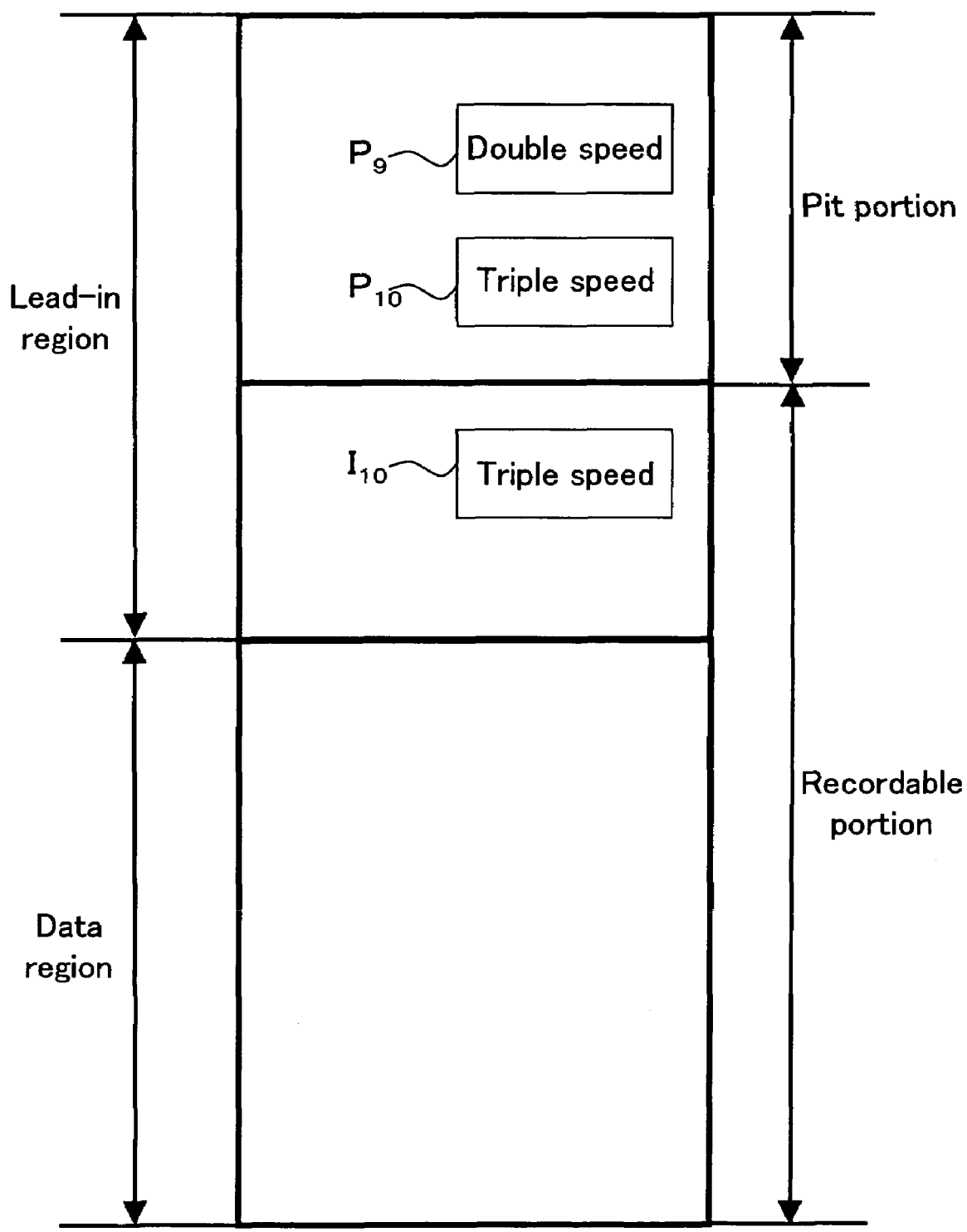
FIG. 10 is a diagram describing a configuration of the information medium according to a fourth embodiment of the present invention.

FIG. 10 is a schematic configuration diagram showing another possible configuration of the recordable disc of the invention. With respect to the recordable disc of FIG. 10, two identifiers $P_9$ and $P_{10}$ specifying double speed and triple speed, respectively, are provided in the pit portion of the lead-in region, and one identifier $I_{10}$ specifying triple speed is provided in the recordable portion of the lead-in region (first recordable portion).

When information signals are recorded to the data region (second recordable portion) of the recordable disc of this embodiment using the information recording and reproducing device configured as shown in FIG. 2, whether to allow recording only at triple speed as specified by the identifier $I_{10}$ of the first recordable portion, whether conversely to disallow only recording at triple speed, which is specified by the identifier $I_{10}$, of the recording speeds specified by the identifiers $P_9$ and $P_{10}$ of the pit portion (that is, to allow recording at double speed or single speed), whether to allow any of the recording speeds specified by the identifiers $P_9$ and $P_{10}$ of the pit portion and the identifier $I_{10}$ of the first recordable portion to be adopted (that is, to allow recording at triple speed or double speed), or whether to allow recording at any speed equal to or less than the recording speed specified by the identifier $I_{10}$ of the first recordable portion (that is, triple speed, double speed, or single speed), can be selected freely by a predetermined algorithm of the system control system 12 (or the recording speed recognition portion 6). Alternatively, which algorithm to adopt can be chosen to conform to standard norms.

It should be noted that in FIG. 10, the identifier $I_{10}$ of the recordable portion of the lead-in region (first recordable portion) specifies the same recording speed as the identifier $P_{10}$ of the pit portion (in this example, triple speed). However, if the identifier of the pit portion specifies a recording speed, then it is sufficient for the identifier of the first recordable portion to be "an identifier that corresponds to the identifier of the pit portion," and is not limited to specifying a recording speed per se. For example, the present invention also includes a configuration in which the identifier of the first recordable portion does not specify a recording speed per se but rather indicates the validity or the invalidity of the identifier of the pit portion. To take a specific example, a conceivable configuration for the recordable disc of FIG. 10 would be to make the identifier $I_{10}$ of the first recordable portion serve as a flag that indicates that the identifier $P_{10}$ is invalid rather than specify a recording speed. That is, if the identifier $I_{10}$ is a value of 0 (or if there is no identifier in the first recordable portion), then recording is possible at double speed and triple speed, and if the identifier $I_{10}$ is a value of 1, then the identifier $P_{10}$ is made invalid (that is, recording at triple speed is not possible). It should be noted that the information expressed by the identifier of the first recordable portion and what that information means are of course not limited to this specific example.

Figure 11:
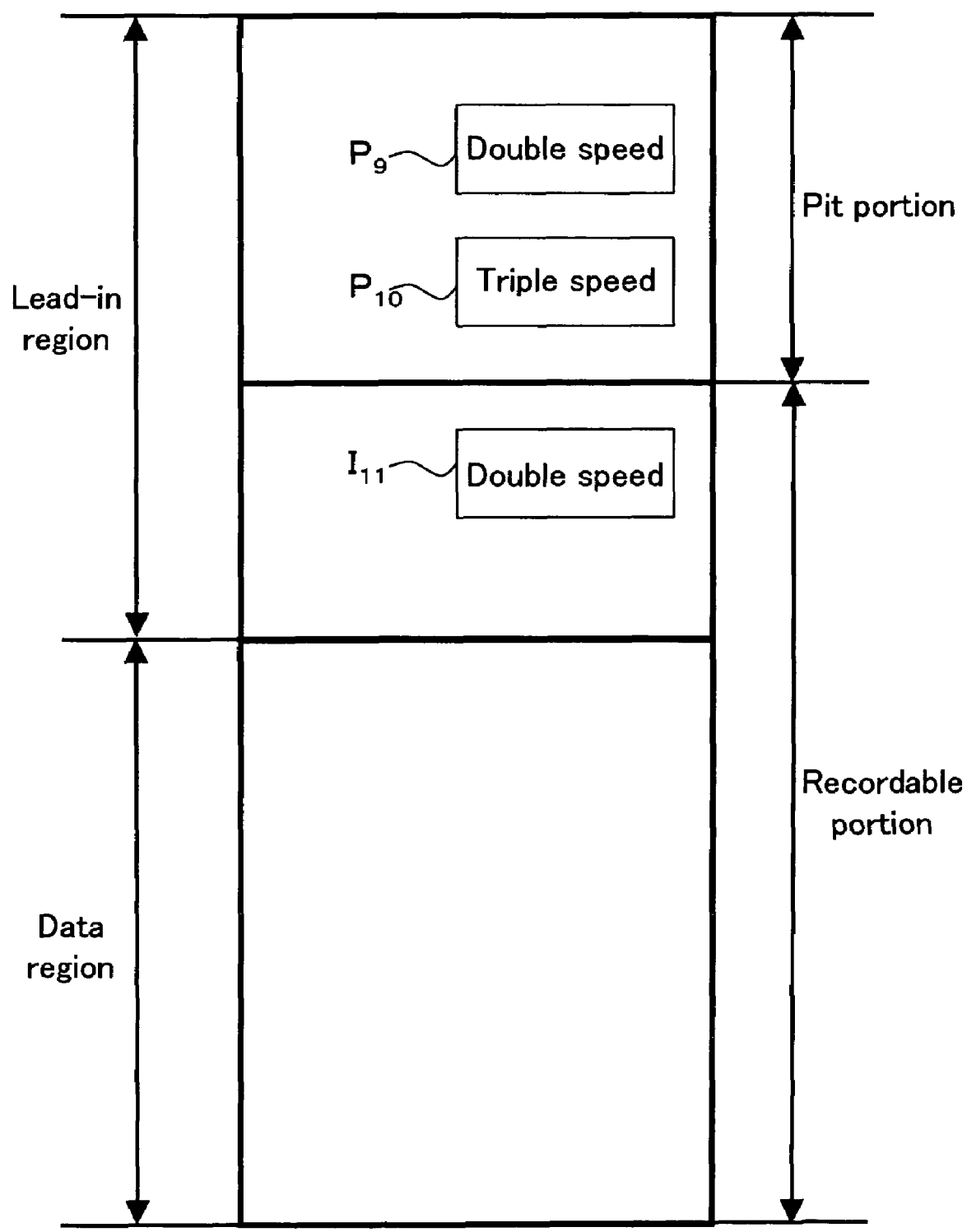
FIG. 11 is a diagram describing another configuration of the information medium according to the fourth embodiment of the present invention.

FIG. 11 is a schematic configuration diagram for describing another possible configuration of the recordable disc of this embodiment. The recordable disc of FIG. 11, like the recordable disc of FIG. 10, is provided with two identifiers $P_9$ and $P_{10}$ specifying double speed and triple speed, respectively, in the pit portion of its lead-in region, and is provided with a single identifier $I_{11}$ specifying double speed in the recordable portion of its lead-in region (the first recordable portion).

When information signals are recorded to the data region of the recordable disc of FIG. 11 using the information recording and reproducing device configured as shown in FIG. 2, whether to allow recording only at double speed as specified by the identifier $I_{11}$ of the first recordable portion, whether conversely to disallow only recording at double speed, which is specified by the identifier $I_{11}$, of the recording speeds specified by the identifiers $P_9$ and $P_{10}$ of the pit portion (that is, to allow recording at triple speed or single speed), whether to allow any of the recording speeds specified by the identifiers $P_9$ and $P_{10}$ of the pit portion and the identifier $I_{11}$ of the first recordable portion to be adopted (that is, to allow recording at triple speed or double speed), or whether to allow recording at any speed equal to or less than the recording speed specified by the identifier $I_{11}$ of the first recordable portion (that is, double speed or single speed), can be set freely by a predetermined algorithm of the system control system 12 (or the recording speed recognition portion 6).

It should be noted that in FIG. 11, the identifier $I_{11}$ of the recordable portion of the lead-in region (first recordable portion) specifies the same recording speed as the identifier $P_9$ of the pit portion (in this example, double speed). However, if the identifier of the pit portion specifies a recording speed, then it is sufficient for the identifier of the first recordable portion to be "an identifier that corresponds to the identifier of the pit portion," and is not limited to specifying a recording speed per se. For example, a configuration in which the identifier of the first recordable portion does not specify a recording speed per se but rather indicates the validity or the invalidity of the identifier of the pit portion is also included in the scope of the present invention. To take a specific example, a conceivable configuration for the recordable disc of FIG. 11 would be to make the identifier $I_{11}$ of the first recordable portion serve as a flag that indicates the validity of the identifiers $P_9$ and $P_{10}$ rather than specifying a recording speed. In other words, if the identifier $I_{11}$ is a value of 0 (or if there is no identifier in the first recordable portion), then both the identifiers $P_9$ and $P_{10}$ are valid (recording is possible at double speed and triple speed), and if the identifier $I_{11}$ is a value of 1, then only the identifier $P_9$ is valid (that is, recording is not possible at triple speed). It should be noted that the information expressed by the identifier of the first recordable portion and what that information means are of course not limited to this specific example.

Figure 12:
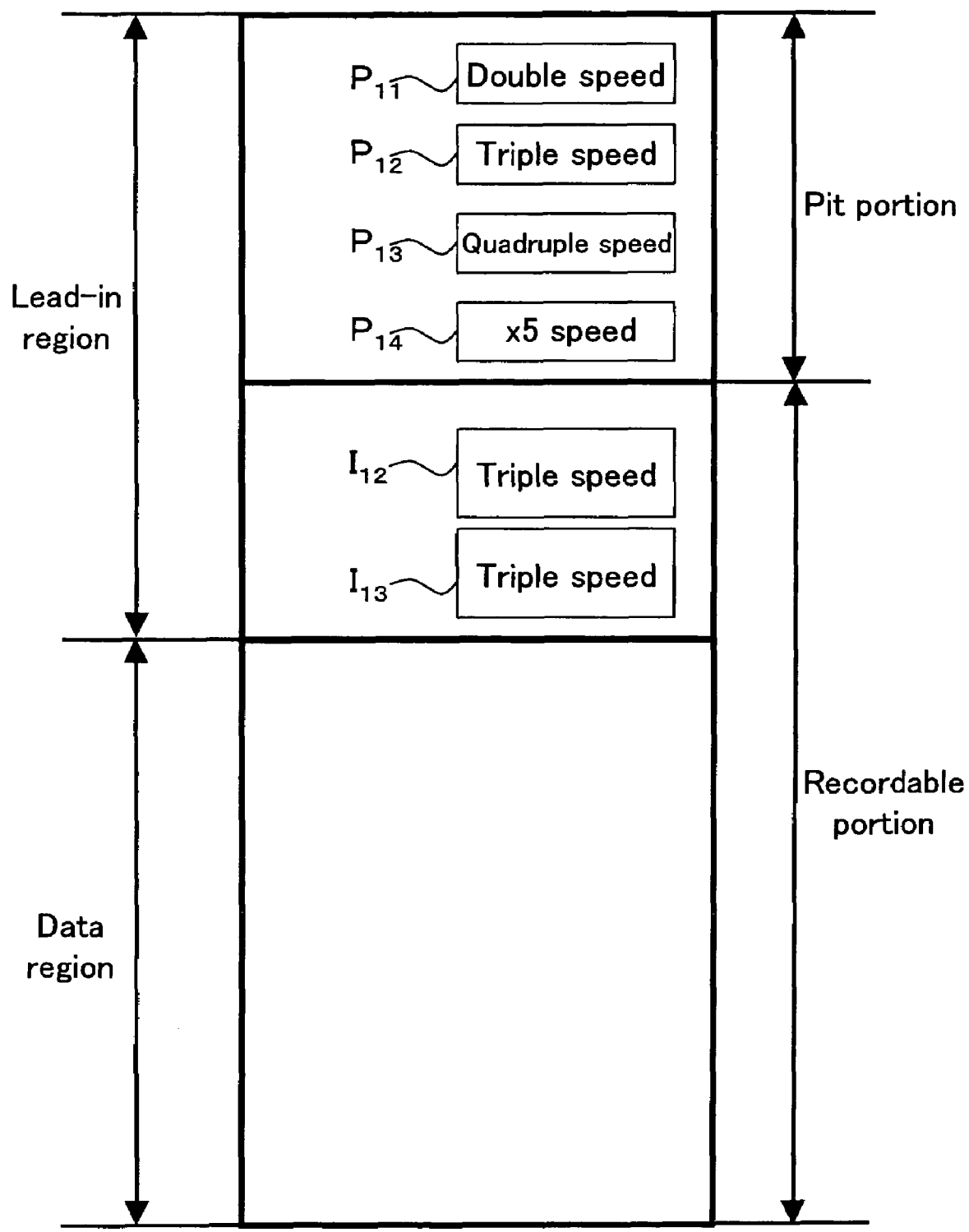
FIG. 12 is a diagram describing yet another configuration of the information medium according to the fourth embodiment of the present invention.

FIG. 12 is a schematic configuration diagram showing yet another possible configuration of the recordable disc according to this embodiment. With respect to this recordable disc, identifiers $P_{11}$ to $P_{14}$ are provided in the pit portion of the lead-in region, and identifiers $I_{12}$ and $I_{13}$ are provided in the recordable portion of the lead-in region (first recordable portion). The identifiers $P_{11}$ to $P_{14}$ specify recording speeds of double speed to ×5 speed, respectively. The identifiers $I_{12}$ and $I_{13}$ both specify a recording speed of triple speed.

According to this configuration, recordable discs that are compatible with any one, or a plurality of, recording speed(s) selected from a group made of double speed to ×5 speed can be freely fabricated using a common substrate for recordable discs compatible with double speed to ×5 speed. That is, an information layer that is compatible with any one recording speed selected from the group consisting of double speed to ×5 speed (here, triple speed) and other required layers are suitably formed on a substrate in which identifiers $P_{11}$ to $P_{14}$ specifying double speed to ×5 speed are recorded as pits by a stamper, and the information layer is initialized, after which identifiers specifying the recording speed that can be adopted for the information layer that is formed (here, identifiers $I_{12}$ and $I_{13}$) are recorded in the first recordable portion. Thus, recording speeds that can be adopted in practice for the recordable discs can be specified by the identifiers of the first recordable portion, regardless of the recording speeds specified by the identifiers of the pit portion. Consequently, for example, even if it is determined prior to shipping that the disc cannot accept every recording speed specified by the identifiers of the pit portion, it is not necessary to discard the disc, as was the case conventionally, and the disc can be used simply by writing at the recording speed that can be accepted for the information layer (here, triple speed) as recorded in the first recordable portion. Also, even if there is a sudden increase in demand for recordable discs that are suited for a specific recording speed, that demand can be met quickly because a common substrate is used, and this configuration is advantageous from the perspective of manufacturing efficiency as well.

If information is to be recorded to this recordable disc using the information recording and reproducing device configured as shown in FIG. 2, then the recording speed recognition portion 6 confirms that the recording speeds specified by the identifiers $I_{12}$ and $I_{13}$ of the first recordable portion match one another, and the system control system 12 carries out recording and controls corresponding to that recording speed. Thus, according to this embodiment, recording a plural number of identical identifiers in the first recordable portion increases the redundancy of these identifiers and allows incorrect determination of the recording speed due to a weak signal from an identifier of the first recordable portion to be prevented, and this increases reliability. Also, reliability can be increased further by adding a procedure for confirming whether the recording speed specified by the identifiers of the first recordable portion matches a recording speed specified by any one of the plurality of identifiers of the pit portion. It should be noted that in the above description, the identifiers $I_{12}$ and $I_{13}$ recorded in the first recordable portion specify the same recording speed as one of the identifiers $P_9$ to $P_{14}$ of the pit portion (here, triple speed indicated by $P_{12}$). However, it is sufficient for the identifiers of the first recordable portion to be "an identifier that corresponds to the identifier of the pit portion," and are not limited to specifying a recording speed per se. For example, a configuration in which the identifiers of the first recordable portion indicate the validity or the invalidity of the recording speed specified by an identifier of the pit portion is included also in the scope of the present invention. Specifically, the recordable disc of FIG. 12 may have a configuration in which the identifiers $I_{12}$ and $I_{13}$ of the first recordable portion serve as flags that indicate the validity or the invalidity of the recording speed specified by any one of the identifiers $P_{11}$ to $P_{14}$ of the pit portion. That is, if the identifiers $I_{12}$ and $I_{13}$ are both a value of 0, or if there is no identifier in the first recordable portion, then it is possible to allow the disc to be recorded at every recording speed specified by the identifiers $P_{11}$ to $P_{14}$ of the pit portion, and if the identifiers $I_{12}$ and $I_{13}$ are both a value of 1, then it is possible for only the recording speed specified by the identifier $P_{11}$ of the pit portion to be made valid (that is, here recording is not allowed at a recording speed of triple speed or higher). Alternatively, if both identifiers $I_{12}$ and $I_{13}$ of the first recordable portion are a value of 1, then it is possible for only the recording speed specified by the identifier $P_{12}$ of the pit portion to be made invalid (that is, here, to allow recording at double speed, quadruple speed, and ×5 speed). It should be noted that the information expressed by the identifiers of the first recordable portion and what that information means are by no means limited to this specific example.

Figure 13:
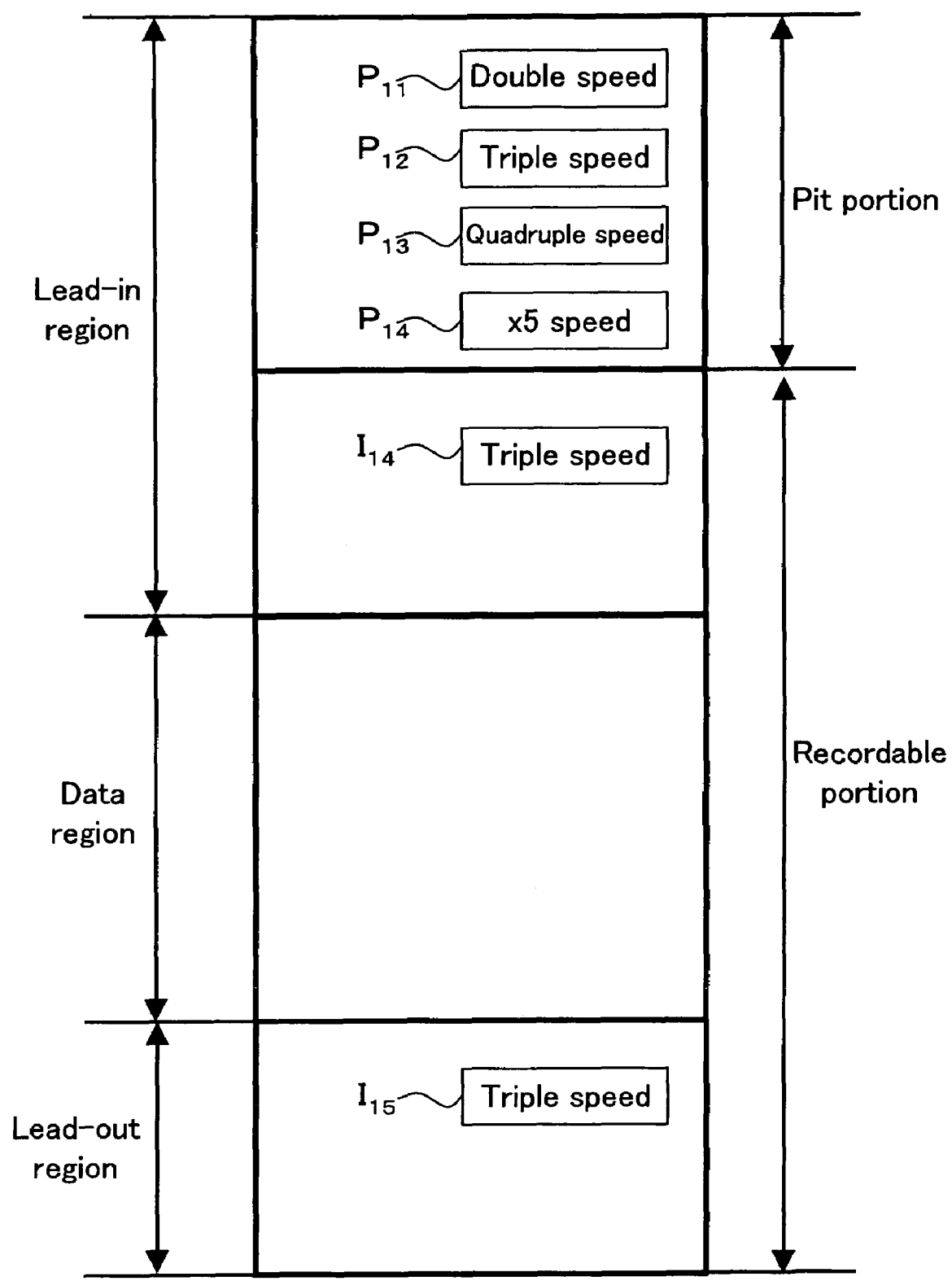
FIG. 13 is a diagram describing yet another configuration of the information medium according to the fourth embodiment of the present invention.
Figure 15:
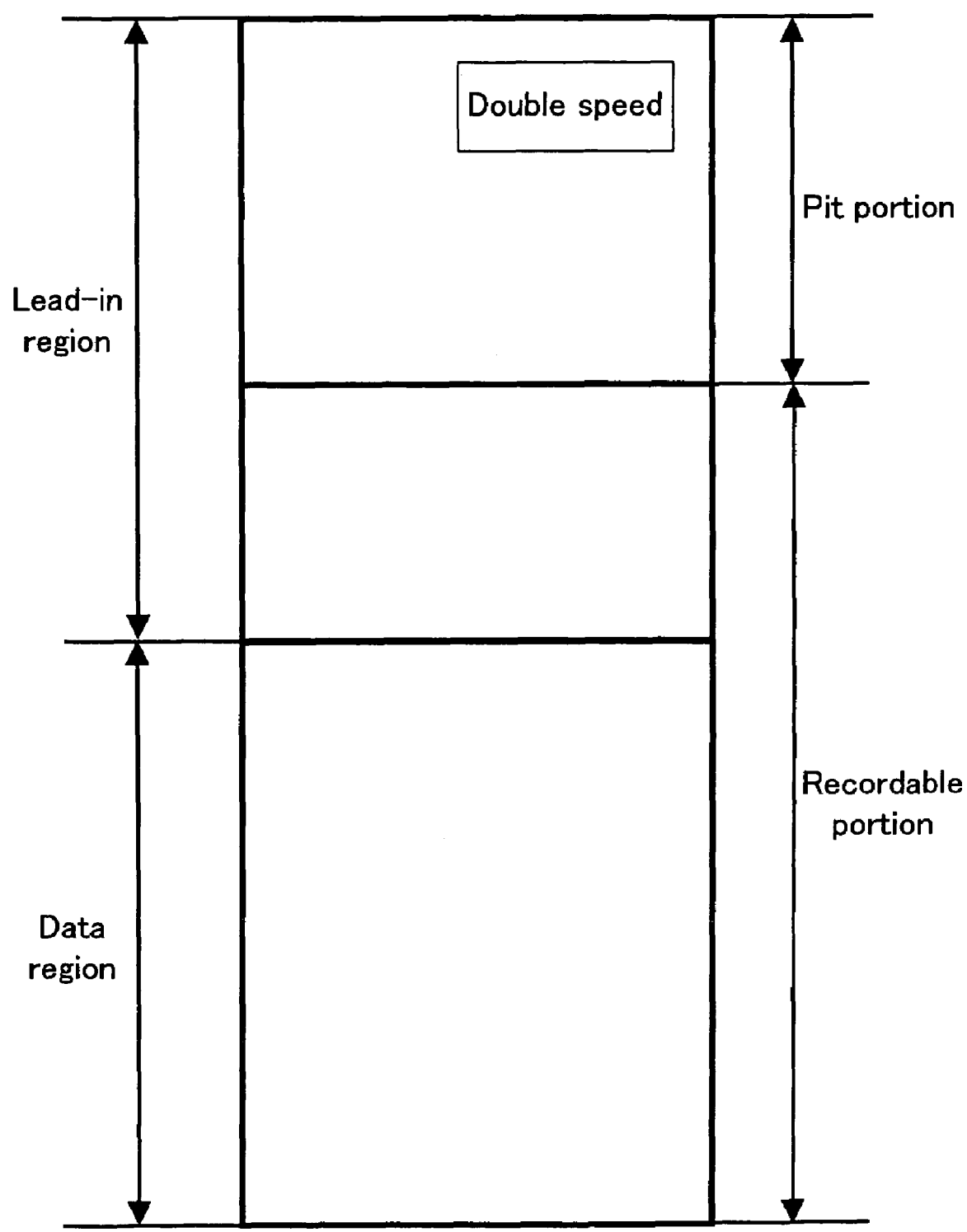
FIG. 15 is a diagram describing the configuration of a conventional information recording medium.

FIG. 13 is a schematic configuration diagram for describing another possible configuration of the recordable disc of this embodiment. The identifiers of the pit portion are the same as in the previous configuration (FIG. 12) of this embodiment, and therefore they are denoted using identical reference numerals ($P_{11}$ to $P_{14}$). This recordable disc differs from the preceding one in that there is one identifier (identifier $I_{14}$) specifying triple speed in the recordable portion of the lead-in region (the first recordable portion), and there is another identifier (identifier $I_{15}$) in the recordable portion of the lead-out region.

The recordable disc shown in FIG. 13 is preferable because the recording speed can be confirmed prior to the start of recording since an identifier is provided in the lead-out region as well. In other words, if the identifier $I_{14}$ of the recordable portion of the lead-in region cannot be recognized, then it is possible to access the lead-out region and confirm the identifier $I_{15}$. Thus, even if for some reason the identifier $I_{14}$ of the lead-in region cannot be read, it is still possible to control the recording speed properly based on the identifier $I_{15}$ of the lead-out region. Alternatively, both the lead-in region and the lead-out region can be accessed before the start of recording so as to confirm both the identifier $I_{14}$ and the identifier $I_{15}$. The lead-out region is overwritten less often than the lead-in region, and thus there is the advantage that identifiers recorded in the lead-out region experience less signal deterioration. It should be noted that FIG. 13 shows an example in which a single identifier each is provided in the recordable portion of the lead-in region and the recordable portion of the lead-out region. However, it is of course possible to provide a plurality of identifiers in these recordable portions.

In the above embodiments, each identifier indicated a single recording speed, however, as shown in FIG. 14, when the identifiers are made to represent a four bit signal, then a single as well as a combination of a plurality of recording speeds can be expressed using a single identifier. The use of such identifiers is preferable from the standpoint that the number of identifiers can be kept from increasing even if the number of recording speeds that can be adopted by the recordable disc increases.

It should be noted that in the embodiments described above, when a configuration is adopted in which the recording conditions (for example, various conditions such as the light intensity when recording, the light intensity when reproducing, and the pulse modulation mode) corresponding to the recording speeds specified by the identifiers are recorded together with the identifiers, then the recording precision of the information recording and reproducing device can be improved, and higher quality information signals can be recorded to the data region.

Also, in the above embodiments, identifiers shown as "quadruple speed," for example, in the drawings indicate that recording is possible up to quadruple speed, but it is also possible for the identifiers to indicate the minimum speed that cannot be adopted by that particular information medium. In this case, if the information medium can be recorded up to triple speed, then the speed specified by the identifier is "quadruple speed."

INDUSTRIAL APPLICABILITY

As set forth above, the information media of the present invention are provided with identifiers specifying the recording speed when recording desired information signals to the data region in at least the recordable portion of the lead-in region, allowing the precision with which the recording speed of the information medium is confirmed to be increased. Thus, it is possible to provide information media capable of recording high quality information signals. Also, the information media yield is increased and resources and energy are kept from being wasted, and this allows costs for the information medium to be reduced. Moreover, there is the excellent effect that simply altering the system control system, for example, of the information recording and reproducing device allows defects in recording discs to be detected.

The invention claimed is:

1. An information medium comprising:
   a lead-in region and a data region in which an information signal can be recorded;
   wherein the lead-in region has a recordable portion that is re-recordable in which information signals can be optically recorded,
   wherein an identifier specifying a recording speed with respect to the data region is provided in the recordable portion of the lead-in region wherein the lead-in region further comprises a pit portion in which non-rewritable pits are formed,
wherein an identifier specifying a recording speed with respect to the data region also is recorded in the pit portion as pits,
wherein the identifier recorded in the pit portion specifies a plurality of different recording speeds; and
wherein the identifier recorded in the recordable portion of the lead-in region specifies at least one of the plurality of different recording speeds.

2. An information medium comprising:
a lead-in region and a data region in which an information signal can be recorded;
wherein the lead-in region has a recordable portion that is re-recordable in which information signals can be optically recorded,
wherein an identifier specifying a recording speed with respect to the data region is provided in the recordable portion of the lead-in region,
wherein the lead-in region further comprises a pit portion in which non-rewritable pits are formed,
wherein an identifier specifying a recording speed with respect to the data region also is recorded in the pit portion as pits,
wherein the identifier recorded in the pit portion specifies a plurality of different recording speeds; and
wherein the identifier recorded in the recordable portion of the lead-in region specifies a different recording speed from the plurality of different recording speeds.

3. An information medium comprising:
a lead-in region and a data region in which an information signal can be recorded;
wherein the lead-in region has a recordable portion that is re-recordable in which information signals can be optically recorded,
wherein an identifier specifying a recording speed with respect to the data region is provided in the recordable portion of the lead-in region,
wherein the lead-in region further comprises a pit portion in which non-rewritable pits are formed,
wherein an identifier specifying a recording speed with respect to the data region also is recorded in the pit portion as pits,
wherein the identifier recorded in the pit portion specifies a plurality of different recording speeds; and
wherein the recording speed specified by the identifier of the lead-in region is equal to or less than a maximum recording speed specified by the identifier of the pit portion.

4. The information medium according to claim 1,
wherein the identifier of the recordable portion of the lead-in region is recorded in a region describing a medium state included in the recordable portion.

5. The information medium according to claim 1, further comprising a lead-out region;
wherein an identifier that is identical to the identifier of the recordable portion of the lead-in region is recorded in the lead-out region as well.

6. An information recording and reproducing device comprising:
an optical pickup for irradiating a light onto an information medium to record and reproduce information signals to and from an information layer of the information medium;
a support portion for rotatably supporting the information medium;
a motor for rotating the information medium supported by the support portion;
a rotation control portion for controlling rotation of the motor; and
a signal processing portion for processing information signals that are reproduced from the information medium by the optical pickup;
wherein when an information medium according to claim 1 is supported by the support portion and the signal processing portion confirms the presence of the identifier from the information signal reproduced by the optical pickup from the recordable portion of the lead-in region of the information medium, the rotation control portion controls the motor in correspondence with the recording speed specified by the identifier, and
wherein if the signal processing portion confirms a plurality of identifiers from the information signal reproduced by the optical pickup from the recordable portion of the lead-in region of the information medium, then the rotation control portion controls the motor so as to correspond to any one of the plurality of recording speeds specified by the plurality of identifiers, or so as to correspond to a recording speed that is less than the slowest recording speed of the plurality of recording speeds.

7. An information recording and reproducing device comprising:
an optical pickup for irradiating a light onto an information medium to record and reproduce information signals to and from an information layer of the information medium;
a support portion for rotatably supporting the information medium;
a motor for rotating the information medium supported by the support portion;
a rotation control portion for controlling rotation of the motor; and
a signal processing portion for processing information signals that are reproduced from the information medium by the optical pickup;
wherein when an information medium according to claim 1 is supported by the support portion and the signal processing portion confirms the presence of the identifier from the information signal reproduced by the optical pickup from the recordable portion of the lead-in region of the information medium, the rotation control portion controls the motor in correspondence with the recording speed specified by the identifier,
wherein the lead-in region of the information medium further comprises a pit portion in which non-rewritable pits are formed;
wherein an identifier specifying a recording speed with respect to the data region is recorded in the pit portion as pits; and
wherein the identifier of the recordable portion of the lead-in region is an identifier that corresponds to the identifier of the pit portion,
the optical pickup reproduces information signals from the recordable portion of the lead-in region and the pit portion of the information medium, and
the signal processing portion checks whether the identifier can be confirmed in the information signal from the recordable portion and the information signal from the pit portion.

8. An information recording and reproducing device comprising:
- an optical pickup for irradiating a light onto an information medium to record and reproduce information signals to and from an information layer of the information
- a support portion for rotatably supporting the information medium;
- a motor for rotating the information medium supported by the support portion;
- a rotation control portion for controlling rotation of the motor; and
- a signal processing portion for processing information signals that are reproduced from the information medium by the optical pickup;
- wherein when an information medium according to claim 1 is supported by the support portion and the signal processing portion confirms the presence of the identifier from the information signal reproduced by the optical pickup from the recordable portion of the lead-in region of the information medium, the rotation control portion controls the motor in correspondence with the recording speed specified by the identifier,
- wherein if the signal processing portion confirms a plurality of identifiers from the information signal reproduced by the optical pickup from the recordable portion of the lead-in region of the information medium, then the rotation control portion controls the motor so as to correspond to any one of the plurality of recording speeds specified by the plurality of identifiers, or so as to correspond to a recording speed that is less than the slowest recording speed of the plurality of recording speeds.

9. The information medium according to claim 2,
wherein the identifier of the recordable portion of the lead-in region is recorded in a region describing a medium state included in the recordable portion.

10. The information medium according to claim 2, further comprising a lead-out region;
wherein an identifier that is identical to the identifier of the recordable portion of the lead-in region is recorded in the lead-out region as well.

11. The information medium according to claim 3,
wherein the identifier of the recordable portion of the lead-in region is recorded in a region describing a medium state included in the recordable portion.

12. The information medium according to claim 3, further comprising a lead-out region;
wherein an identifier that is identical to the identifier of the recordable portion of the lead-in region is recorded in the lead-out region as well.

\* \* \* \* \*